US012608959B2

(12) United States Patent
Debler et al.

(10) Patent No.: US 12,608,959 B2
(45) Date of Patent: Apr. 21, 2026

(54) SYSTEM AND METHOD FOR PROCESSING IMAGE DATA TO GENERATE A PAVEMENT SURFACE EVALUATION AND RATING REPORT

(71) Applicant: Mitsubishi Electric Automotive America, Inc., Mason, OH (US)

(72) Inventors: Brian J. Debler, Northville, MI (US); Matheus F. De Almeida, Northville, MI (US); Michael D. Horani, Northville, MI (US)

(73) Assignee: Mitsubishi Electric Automotive America, Inc., Mason, OH (US)

( * ) Notice: Subject to any disclaimer, the term of this patent is extended or adjusted under 35 U.S.C. 154(b) by 203 days.

(21) Appl. No.: 18/545,518

(22) Filed: Dec. 19, 2023

(65) Prior Publication Data

US 2025/0200991 A1    Jun. 19, 2025

(51) Int. Cl.
*G06V 20/56*        (2022.01)
*G06T 7/73*         (2017.01)
(Continued)

(52) U.S. Cl.
CPC .............. *G06V 20/588* (2022.01); *G06T 7/73* (2017.01); *G06V 10/44* (2022.01); *G06V 10/761* (2022.01);
(Continued)

(58) Field of Classification Search
None
See application file for complete search history.

(56) References Cited

U.S. PATENT DOCUMENTS

| | | | |
|---|---|---|---|
| 10,967,869 B2 | 4/2021 | Kimura et al. | |
| 2024/0167962 A1* | 5/2024 | Ramos | G06T 7/0004 |
| 2025/0086985 A1* | 3/2025 | Jahanshahi | G06T 7/0006 |

FOREIGN PATENT DOCUMENTS

| | | |
|---|---|---|
| CN | 112184625 A | 1/2021 |
| KR | 102094341 B1 | 3/2020 |

(Continued)

OTHER PUBLICATIONS

Cuthbert Ruseruka et al., "Road Condition Monitoring Using Vehicle Built-in Cameras and GPS Sensors: A Deep Learning Approach", Vehicles, 5, Aug. 7, 2023: pp. 931-948.
(Continued)

*Primary Examiner* — James M Anderson, II
(74) *Attorney, Agent, or Firm* — Posz Law Group, PLC

(57) ABSTRACT

A computer-implemented method is provided for processing image data to generate a Pavement Surface Evaluation and Rating (PASER) report for a road system. The method comprises: collecting road data including a plurality of road images; identifying a plurality of features-of-interest based on the plurality of road images, each of the features-of-interest being a road irregularity in the road system; estimating one or more physical parameters of the features-of-interest based on the road images; calculating an actual location for each of the features-of-interest based on the road data; uniquely identifying all of the features-of-interest and eliminating duplicate occurrences of a same feature-of-interest in the features-of-interest based on the road data and the actual locations of the features-of-interest; and identifying a corresponding road position for each feature-of-interest based on the road data and the actual locations of the features-of-interest.

17 Claims, 7 Drawing Sheets

(51) Int. Cl.
  G06V 10/44 (2022.01)
  G06V 10/74 (2022.01)
  G06V 10/771 (2022.01)

(52) U.S. Cl.
  CPC ........ G06V 10/771 (2022.01); *G06V 2201/07* (2022.01)

(56) References Cited

FOREIGN PATENT DOCUMENTS

KR    20220074649 A    6/2022
KR    102427308 B1    8/2022

OTHER PUBLICATIONS

Hamed Majidifard et al., "Deep Machine Learning Approach to Develop a New Asphalt Pavement Condition Index", Construction and Building Materials, 247, Feb. 18, 2020.

* cited by examiner

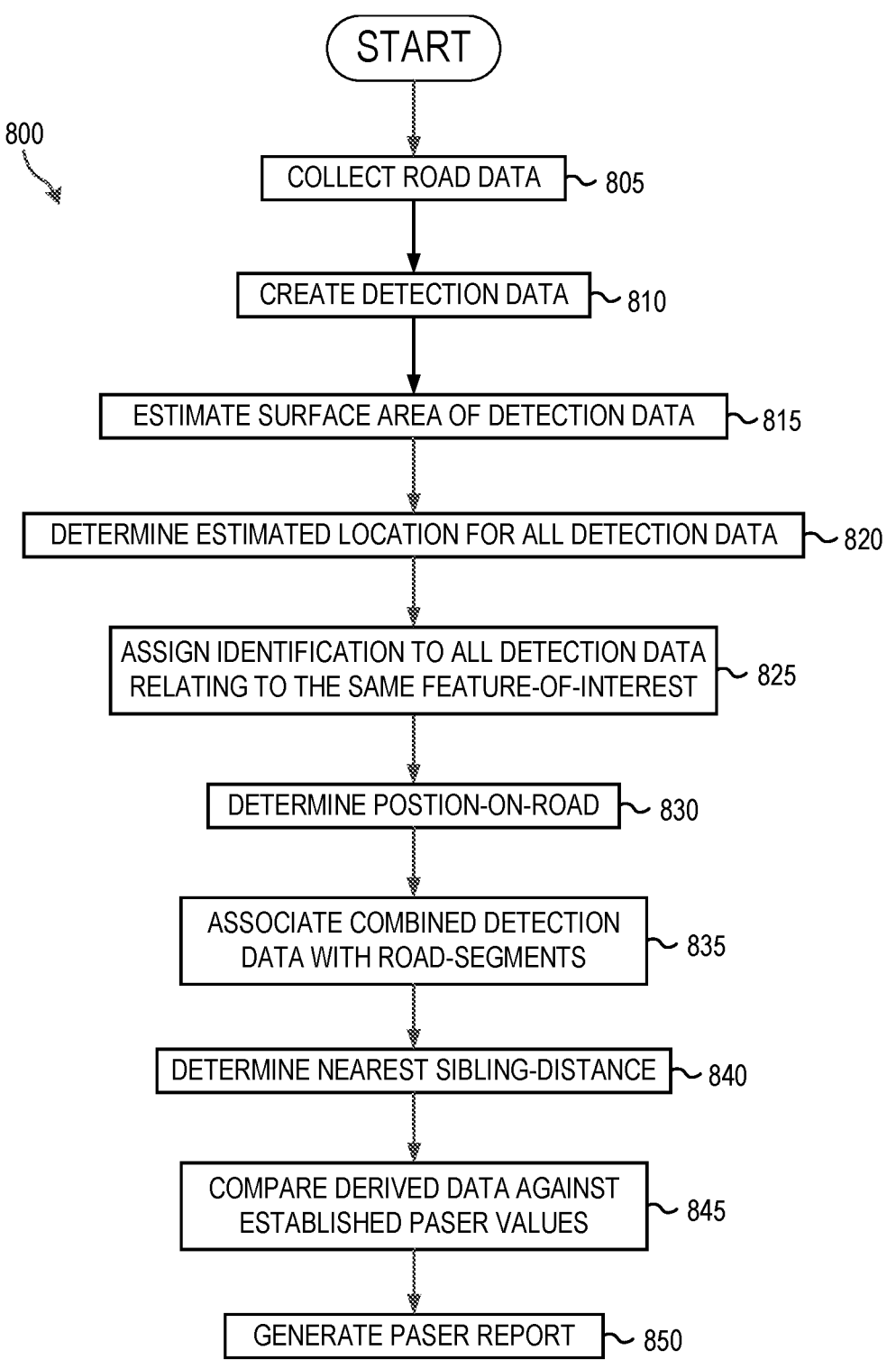

800

START

COLLECT ROAD DATA ~ 805

CREATE DETECTION DATA ~ 810

ESTIMATE SURFACE AREA OF DETECTION DATA ~ 815

DETERMINE ESTIMATED LOCATION FOR ALL DETECTION DATA ~ 820

ASSIGN IDENTIFICATION TO ALL DETECTION DATA RELATING TO THE SAME FEATURE-OF-INTEREST ~ 825

DETERMINE POSTION-ON-ROAD ~ 830

ASSOCIATE COMBINED DETECTION DATA WITH ROAD-SEGMENTS ~ 835

DETERMINE NEAREST SIBLING-DISTANCE ~ 840

COMPARE DERIVED DATA AGAINST ESTABLISHED PASER VALUES ~ 845

GENERATE PASER REPORT ~ 850

FIG. 8

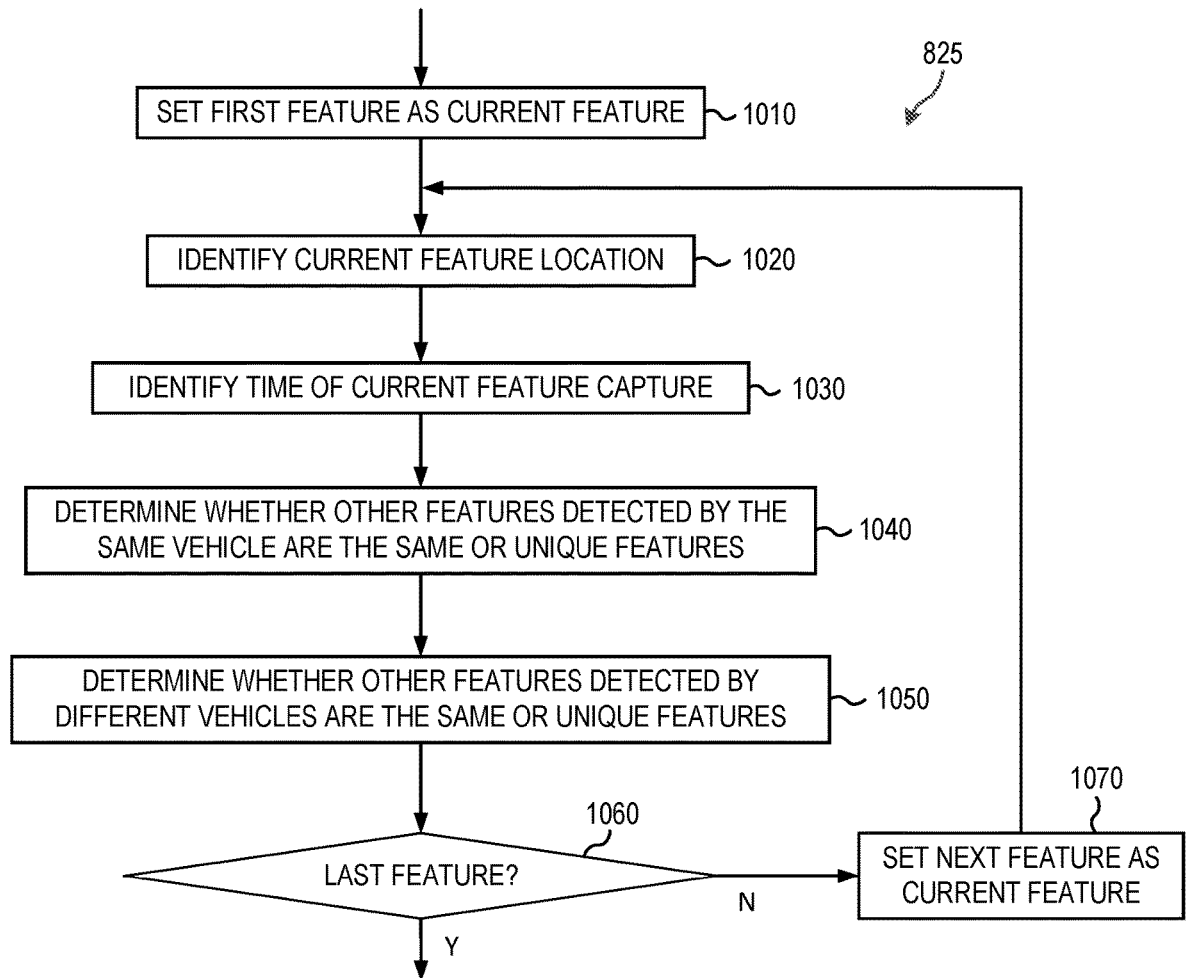

825

SET FIRST FEATURE AS CURRENT FEATURE ∼ 1010

IDENTIFY CURRENT FEATURE LOCATION ∼ 1020

IDENTIFY TIME OF CURRENT FEATURE CAPTURE ∼ 1030

DETERMINE WHETHER OTHER FEATURES DETECTED BY THE SAME VEHICLE ARE THE SAME OR UNIQUE FEATURES ∼ 1040

DETERMINE WHETHER OTHER FEATURES DETECTED BY DIFFERENT VEHICLES ARE THE SAME OR UNIQUE FEATURES ∼ 1050

1060

LAST FEATURE?

N

Y

1070

SET NEXT FEATURE AS CURRENT FEATURE

SYSTEM AND METHOD FOR PROCESSING IMAGE DATA TO GENERATE A PAVEMENT SURFACE EVALUATION AND RATING REPORT

TECHNICAL FIELD

The disclosed systems and methods relate generally to computer systems for generating Pavement Surface Evaluation and Rating (PASER) reports. More particularly, the disclosed systems and methods relate to way of generating determining a PASER rating report using image data obtained by vehicle cameras used on multiple vehicles traversing a road system.

BACKGROUND

The Pavement Surface Evaluation and Rating (PASER) scale was developed by the University of Wisconsin-Madison to identify the condition of a road. It provides a 1-10 rating system for road pavement, which is determined based on visual inspection. In this way the PASER scale provides a way for different roads to be compared in a predictable manner. This rating system can be used to assess the quality of a given road segment and the need for maintenance on a given road segment.

The PASER scale is divided into five quality categories: Excellent (corresponding to a PASER rating of 9 or 10); Good (corresponding to a PASER rating of 7 or 8); Fair (corresponding to a PASER rating of 5 or 6); Poor (corresponding to a PASER rating of 3 or 4); and Failed (corresponding to a PASER rating of 1 or 2). A rating of Excellent indicates that either an asphalt road or a cement road requires no maintenance. A rating of Good indicates that an asphalt road requires crack sealing and minor patching, while a cement road requires routine maintenance. A rating of Fair indicates that of asphalt road requires non-structural preservation treatments, while a cement road requires surface repairs and a partial-depth patching. A rating of Poor indicates that an asphalt road requires structural renewal, while a cement road requires extensive slab or joint rehabilitation. A rating of Failed indicates that either an asphalt road or a cement road requires reconstruction.

PASER values are generally provided by road segment, with each road segment being defined as a portion of the road between intersections. Typically, PASER reports are generated for a particular area by the state in which the area is located, though some municipalities prepare their own PASER reports.

Because PASER ratings are generated based on visual inspection, they can often be determined quickly, potentially by what is called a "windshield survey" in which a vehicle is driven throughout a road system and a driver or passenger makes an on-the-spot visual determination of each road segment within the road system. However, it has generally been accepted that because of the nature of which PASER ratings are generated, they could not be generated automatically, without human intervention to make visual assessments of the road conditions.

It is therefore desirable to provide a system and method through which an automatic PASER assessment of a road system can be made based on gathered visual image data with either no or minimal human input.

SUMMARY OF THE INVENTION

According to one or more embodiments, a computer-implemented method is provided for processing image data to generate a Pavement Surface Evaluation and Rating (PASER) report for a road system. The method comprises: collecting road data including a plurality of road images; identifying a plurality of features-of-interest based on the plurality of road images, each of the plurality of features-of-interest being a road irregularity in the road system; estimating one or more physical parameters of the plurality of features-of-interest based on the plurality of road images; calculating an actual location for each of the plurality of features-of-interest based on the road data; uniquely identifying all of the plurality of features-of-interest and eliminating duplicate occurrences of a same feature-of-interest in the plurality of features-of-interest based on the road data and the actual locations of the plurality of features-of-interest; and identifying a corresponding road position for each of the plurality of features-of-interest based on the road data and the actual locations of the plurality of features-of-interest.

The method may further comprise: associating each of the plurality of features-of-interest with one of a plurality of road segments located within the road system based on the road data and the actual locations of the plurality of features-of-interest; selecting a first road segment from the plurality of road segments as a selected road segment; selecting a subset of the plurality of features-of-interest that are located within a selected road segment as a selected subset; calculating a distance between each unique feature-of-interest in the selected subset and a nearest feature-of-interest in the first subset based on the road data and the actual locations of the plurality of features-of-interest; and generating a PASER estimation value for the selected road segment based on derived data for the selected road segment and stored baseline PASER data. The road images may each be associated with a corresponding road segment chosen from the plurality of road segments, and the derived data for the selected road segment may include the one or more physical parameters of the plurality of features-of-interest associated with the selected road segment, the actual location of each of the plurality of features-of-interest associated with the selected road segment, and the distances between the selected features-of-interest and the nearest features-of-interest associated with the selected road segment.

The method may further comprise: repeating the operations of selecting a subset of the plurality of features-of-interest, calculating a distance between the unique feature-of-interest and a nearest feature-of-interest, and generating a PASER estimation value for each remaining road segment in the plurality of road segments; and generating a PASER report based on the PASER estimation values for each of the plurality of road segments associated with the road system.

The features-of-interest may each be one of a pothole, a crack, a patch, or a utility repair.

For each selected feature-of-interest selected from the plurality of features-of-interest, the one or more physical parameters of the selected feature-of-interest may include at least one of an area of the selected feature-of-interest, a longest length of the feature-of interest, a position of the feature-of-interest on the road segment, and an angle of the feature-of-interest with respect to a length of the corresponding road segment.

The road data may further include: a global positioning system location of a vehicle that captured each of the plurality of road images at the moment when the vehicle captured a corresponding road image, and a date and time when the vehicle captured the corresponding road image.

The operation of calculating an actual location for each of the plurality of features-of-interest may further include:

identifying a current location of a vehicle on the road; identifying a selected feature-of-interest from the plurality of features-of-interest based on a corresponding road image selected from the plurality of road images and captured by a camera associated with the vehicle; identifying a shortest distance from the vehicle to the selected feature-of-interest based on the corresponding road image; identifying a deflection angle of the shortest distance from the vehicle to the selected feature-of-interest with respect to a reference direction; modifying the current location of the vehicle based on the shortest distance and the deflection angle to generate the actual location of the selected feature-of-interest; and repeating the operations of identifying a current location of a vehicle, identifying a selected feature-of-interest, identifying a shortest distance, identifying a deflection angle, and modifying the current location of the vehicle based for each remaining feature-of-interest in the plurality of features-of-interest.

The operation of uniquely identifying all of the plurality of features-of-interest and eliminating duplicate occurrences of a same feature-of-interest in the plurality of features-of-interest may further include: selecting a first feature-of-interest from the plurality of features-of-interest, the first feature-of-interest being associated with a first road image selected from the plurality of road images; identifying a first actual location of the first feature-of-interest; identifying a vehicle associated with a camera that captured the first road image; identifying a first date and time at which the camera captured the first road image; selecting a second feature-of-interest from the plurality of features-of-interest, the second feature-of-interest being associated with a second road image selected from the plurality of road images, the second road image having been captured by the camera; identifying a second actual location of the second feature-of-interest; identifying a second date and time at which the camera captured the second road image; comparing the first date and time with the second date and time to determine if the first date and time is within a set time threshold of the second date and time; and comparing the first actual location with the second actual location to determine if the first actual location is within a set distance threshold of the second actual location.

The method may further comprise: determining that the first feature-of-interest is the same as the second feature-of-interest in response to a determination that the first time is within the set time threshold of the second date and time and the first actual location is within the set distance threshold of the second actual location.

The method may further comprise: determining that the first feature-of-interest is different from the second feature-of-interest in response to one of a determination that the first time is not within the set time threshold of the second date and time and a determination that the first actual location is not within the set distance threshold of the second actual location.

The operation of uniquely identifying all of the plurality of features-of-interest and eliminating duplicate occurrences of a same feature-of-interest in the plurality of features-of-interest may further include: selecting a first feature-of-interest from the plurality of features-of-interest, the first feature-of-interest being associated with a first road image selected from the plurality of road images; identifying a first actual location of the first feature-of-interest; identifying a first vehicle associated with a first camera that captured the first road image; selecting a second feature-of-interest from the plurality of features-of-interest, the second feature-of-interest being associated with a second road image selected from the plurality of road images, the second road image having been captured by a second camera associated with a second vehicle different than the first vehicle; identifying a second actual location of the second feature-of-interest; and comparing the first actual location with the second actual location to determine if the first actual location is within a set distance threshold of the second actual location.

The method may further comprise: determining that the first feature-of-interest is the same as the second feature-of-interest in response to a determination that the first actual location is within the set distance threshold of the second actual location.

The method may further comprise: determining that the first feature-of-interest is different from the second feature-of-interest in response to a determination that the first actual location is not within the set distance threshold of the second actual location.

A non-transitory computer-readable medium may also be provided, comprising instructions for execution by a computer. The instructions may include a computer-implemented method for processing image data to generate a Pavement Surface Evaluation and Rating (PASER) report for a road system, and the instructions may be for implementing: collecting road data including a plurality of road images; identifying a plurality of features-of-interest based on the plurality of road images, each of the plurality of features-of-interest being a road irregularity in the road system; estimating one or more physical parameters of the plurality of features-of-interest based on the plurality of road images; calculating an actual location for each of the plurality of features-of-interest based on the road data; uniquely identifying all of the plurality of features-of-interest and eliminating duplicate occurrences of a same feature-of-interest in the plurality of features-of-interest based on the road data and the actual locations of the plurality of features-of-interest; and identifying a corresponding road position for each of the plurality of features-of-interest based on the road data and the actual locations of the plurality of features-of-interest.

The instructions may be for further implementing: associating each of the plurality of features-of-interest with one of a plurality of road segments located within the road system based on the road data and the actual locations of the plurality of features-of-interest; selecting a first road segment from the plurality of road segments as a selected road segment; selecting a subset of the plurality of features-of-interest that are located within a selected road segment as a selected subset; calculating a distance between each unique feature-of-interest in the selected subset and a nearest feature-of-interest in the first subset based on the road data and the actual locations of the plurality of features-of-interest; and generating a PASER estimation value for the selected road segment based on derived data for the selected road segment and stored baseline PASER data. The road images may each be associated with a corresponding road segment chosen from the plurality of road segments, and the derived data for the selected road segment may include the one or more physical parameters of the plurality of features-of-interest associated with the selected road segment, the actual location of each of the plurality of features-of-interest associated with the selected road segment, and the distances between the selected features-of-interest and the nearest features-of-interest associated with the selected road segment.

The instructions may be for further implementing: repeating the operations of selecting a subset of the plurality of features-of-interest, calculating a distance between the unique feature-of-interest and a nearest feature-of-interest, and generating a PASER estimation value for each remaining road segment in the plurality of road segments; and generating a PASER report based on the PASER estimation values for each of the plurality of road segments associated with the road system.

The features-of-interest may each be one of a pothole, a crack, a patch, or a utility repair.

For each selected feature-of-interest selected from the plurality of features-of-interest, the one or more physical parameters of the selected feature-of-interest may include at least one of an area of the selected feature-of-interest, a longest length of the feature-of interest, a position of the feature-of-interest on the road segment, and an angle of the feature-of-interest with respect to a length of the corresponding road segment.

The road data may further include: a global positioning system location of a vehicle that captured each of the plurality of road images at the moment when the vehicle captured a corresponding road image, and a date and time when the vehicle captured the corresponding road image.

The operation of calculating an actual location for each of the plurality of features-of-interest may further include: identifying a current location of a vehicle on the road; identifying a selected feature-of-interest from the plurality of features-of-interest based on a corresponding road image selected from the plurality of road images and captured by a camera associated with the vehicle; identifying a shortest distance from the vehicle to the selected feature-of-interest based on the corresponding road image; identifying a deflection angle of the shortest distance from the vehicle to the selected feature-of-interest with respect to a reference direction;

modifying the current location of the vehicle based on the shortest distance and the deflection angle to generate the actual location of the selected feature-of-interest; and repeating the operations of identifying a current location of a vehicle, identifying a selected feature-of-interest, identifying a shortest distance, identifying a deflection angle, and modifying the current location of the vehicle based for each remaining feature-of-interest in the plurality of features-of-interest.

The operation of uniquely identifying all of the plurality of features-of-interest and eliminating duplicate occurrences of a same feature-of-interest in the plurality of features-of-interest may further include: selecting a first feature-of-interest from the plurality of features-of-interest, the first feature-of-interest being associated with a first road image selected from the plurality of road images; identifying a first actual location of the first feature-of-interest; identifying a vehicle associated with a camera that captured the first road image; identifying a first date and time at which the camera captured the first road image; selecting a second feature-of-interest from the plurality of features-of-interest, the second feature-of-interest being associated with a second road image selected from the plurality of road images, the second road image having been captured by the camera; identifying a second actual location of the second feature-of-interest; identifying a second date and time at which the camera captured the second road image; comparing the first date and time with the second date and time to determine if the first date and time is within a set time threshold of the second date and time; and comparing the first actual location with the second actual location to determine if the first actual location is within a set distance threshold of the second actual location.

The instructions may be for further implementing: determining that the first feature-of-interest is the same as the second feature-of-interest in response to a determination that the first time is within the set time threshold of the second date and time and the first actual location is within the set distance threshold of the second actual location.

The instructions may be for further implementing: determining that the first feature-of-interest is different from the second feature-of-interest in response to one of a determination that the first time is not within the set time threshold of the second date and time and a determination that the first actual location is not within the set distance threshold of the second actual location.

The operation of uniquely identifying all of the plurality of features-of-interest and eliminating duplicate occurrences of a same feature-of-interest in the plurality of features-of-interest may further include: selecting a first feature-of-interest from the plurality of features-of-interest, the first feature-of-interest being associated with a first road image selected from the plurality of road images; identifying a first actual location of the first feature-of-interest; identifying a first vehicle associated with a first camera that captured the first road image; selecting a second feature-of-interest from the plurality of features-of-interest, the second feature-of-interest being associated with a second road image selected from the plurality of road images, the second road image having been captured by a second camera associated with a second vehicle different than the first vehicle; identifying a second actual location of the second feature-of-interest; and comparing the first actual location with the second actual location to determine if the first actual location is within a set distance threshold of the second actual location.

The instructions may be for further implementing: determining that the first feature-of-interest is the same as the second feature-of-interest in response to a determination that the first actual location is within the set distance threshold of the second actual location.

The instructions may be for further implementing: determining that the first feature-of-interest is different from the second feature-of-interest in response to a determination that the first actual location is not within the set distance threshold of the second actual location.

A computer system may be provided that is configured for processing image data to generate a Pavement Surface Evaluation and Rating (PASER) report for a road system. The system may comprise: a memory configured to store data and instructions; and a processor cooperatively operable with the memory, and configured to facilitate: collecting road data including a plurality of road images; identifying a plurality of features-of-interest based on the plurality of road images, each of the plurality of features-of-interest being a road irregularity in the road system; estimating one or more physical parameters of the plurality of features-of-interest based on the plurality of road images; calculating an actual location for each of the plurality of features-of-interest based on the road data; uniquely identifying all of the plurality of features-of-interest and eliminating duplicate occurrences of a same feature-of-interest in the plurality of features-of-interest based on the road data and the actual locations of the plurality of features-of-interest; and identifying a corresponding road position for each of the plurality of features-of-interest based on the road data and the actual locations of the plurality of features-of-interest.

The processor may be further configured to facilitate: associating each of the plurality of features-of-interest with one of a plurality of road segments located within the road system based on the road data and the actual locations of the plurality of features-of-interest; selecting a first road segment from the plurality of road segments as a selected road segment; selecting a subset of the plurality of features-of-interest that are located within a selected road segment as a selected subset; calculating a distance between each unique feature-of-interest in the selected subset and a nearest feature-of-interest in the first subset based on the road data and the actual locations of the plurality of features-of-interest; and generating a PASER estimation value for the selected road segment based on derived data for the selected road segment and stored baseline PASER data. The road images may each be associated with a corresponding road segment chosen from the plurality of road segments, and the derived data for the selected road segment may include the one or more physical parameters of the plurality of features-of-interest associated with the selected road segment, the actual location of each of the plurality of features-of-interest associated with the selected road segment, and the distances between the selected features-of-interest and the nearest features-of-interest associated with the selected road segment.

The processor may be further configured to facilitate: repeating the operations of selecting a subset of the plurality of features-of-interest, calculating a distance between the unique feature-of-interest and a nearest feature-of-interest, and generating a PASER estimation value for each remaining road segment in the plurality of road segments; and generating a PASER report based on the PASER estimation values for each of the plurality of road segments associated with the road system.

The features-of-interest may each be one of a pothole, a crack, a patch, or a utility repair.

For each selected feature-of-interest selected from the plurality of features-of-interest, the one or more physical parameters of the selected feature-of-interest may include at least one of an area of the selected feature-of-interest, a longest length of the feature-of interest, a position of the feature-of-interest on the road segment, and an angle of the feature-of-interest with respect to a length of the corresponding road segment.

The road data may further include: a global positioning system location of a vehicle that captured each of the plurality of road images at the moment when the vehicle captured a corresponding road image, and a date and time when the vehicle captured the corresponding road image.

The operation of calculating an actual location for each of the plurality of features-of-interest may further include: identifying a current location of a vehicle on the road; identifying a selected feature-of-interest from the plurality of features-of-interest based on a corresponding road image selected from the plurality of road images and captured by a camera associated with the vehicle; identifying a shortest distance from the vehicle to the selected feature-of-interest based on the corresponding road image; identifying a deflection angle of the shortest distance from the vehicle to the selected feature-of-interest with respect to a reference direction; modifying the current location of the vehicle based on the shortest distance and the deflection angle to generate the actual location of the selected feature-of-interest; and repeating the operations of identifying a current location of a vehicle, identifying a selected feature-of-interest, identifying a shortest distance, identifying a deflection angle, and modifying the current location of the vehicle based for each remaining feature-of-interest in the plurality of features-of-interest.

The operation of uniquely identifying all of the plurality of features-of-interest and eliminating duplicate occurrences of a same feature-of-interest in the plurality of features-of-interest may further include: selecting a first feature-of-interest from the plurality of features-of-interest, the first feature-of-interest being associated with a first road image selected from the plurality of road images; identifying a first actual location of the first feature-of-interest; identifying a vehicle associated with a camera that captured the first road image; identifying a first date and time at which the camera captured the first road image; selecting a second feature-of-interest from the plurality of features-of-interest, the second feature-of-interest being associated with a second road image selected from the plurality of road images, the second road image having been captured by the camera; identifying a second actual location of the second feature-of-interest; identifying a second date and time at which the camera captured the second road image; comparing the first date and time with the second date and time to determine if the first date and time is within a set time threshold of the second date and time; and comparing the first actual location with the second actual location to determine if the first actual location is within a set distance threshold of the second actual location.

The processor may be further configured to facilitate: determining that the first feature-of-interest is the same as the second feature-of-interest in response to a determination that the first time is within the set time threshold of the second date and time and the first actual location is within the set distance threshold of the second actual location.

The processor may be further configured to facilitate: determining that the first feature-of-interest is different from the second feature-of-interest in response to one of a determination that the first time is not within the set time threshold of the second date and time and a determination that the first actual location is not within the set distance threshold of the second actual location.

The operation of uniquely identifying all of the plurality of features-of-interest and eliminating duplicate occurrences of a same feature-of-interest in the plurality of features-of-interest may further include: selecting a first feature-of-interest from the plurality of features-of-interest, the first feature-of-interest being associated with a first road image selected from the plurality of road images; identifying a first actual location of the first feature-of-interest; identifying a first vehicle associated with a first camera that captured the first road image; selecting a second feature-of-interest from the plurality of features-of-interest, the second feature-of-interest being associated with a second road image selected from the plurality of road images, the second road image having been captured by a second camera associated with a second vehicle different than the first vehicle; identifying a second actual location of the second feature-of-interest; and comparing the first actual location with the second actual location to determine if the first actual location is within a set distance threshold of the second actual location.

The processor may be further configured to facilitate: determining that the first feature-of-interest is the same as the second feature-of-interest in response to a determination that the first actual location is within the set distance threshold of the second actual location.

The processor may be further configured to facilitate: determining that the first feature-of-interest is different from the second feature-of-interest in response to a determination that the first actual location is not within the set distance threshold of the second actual location.

A method may be provided for measuring a feature-of-interest on a road, the method comprising: identifying a current location of a vehicle on the road; collecting a road image from a location on the road via a camera mounted on the vehicle; identifying the feature-of-interest based on the road image, the feature-of-interest being a road irregularity on the road; estimating one or more physical parameters of the feature-of-interest based on the road image; and calculating an actual location for the feature-of-interest based on the current location of the vehicle and the image data.

The calculating of the actual location of the feature-of-interest may further include: identifying a shortest distance from the vehicle to the feature-of-interest based on the image data; identifying a deflection angle of the shortest distance from the vehicle to the feature-of-interest with respect to a reference direction; and modifying the current location of the vehicle based on the shortest distance and the deflection angle to generate the actual location.

BRIEF DESCRIPTION OF THE DRAWINGS

The accompanying figures, where like reference numerals refer to identical or functionally similar elements and which together with the detailed description below are incorporated in and form part of the specification, serve to further illustrate an exemplary embodiment and to explain various principles and advantages in accordance with the present disclosure.

FIG. 8 is a flowchart showing an operation of generating a PASER report according to disclosed embodiments;

FIG. 10 is a flowchart showing an operation of assigning identification to all detection data relating to the same feature-of-interest according to disclosed embodiments;

DETAILED DESCRIPTION

Figure 1:
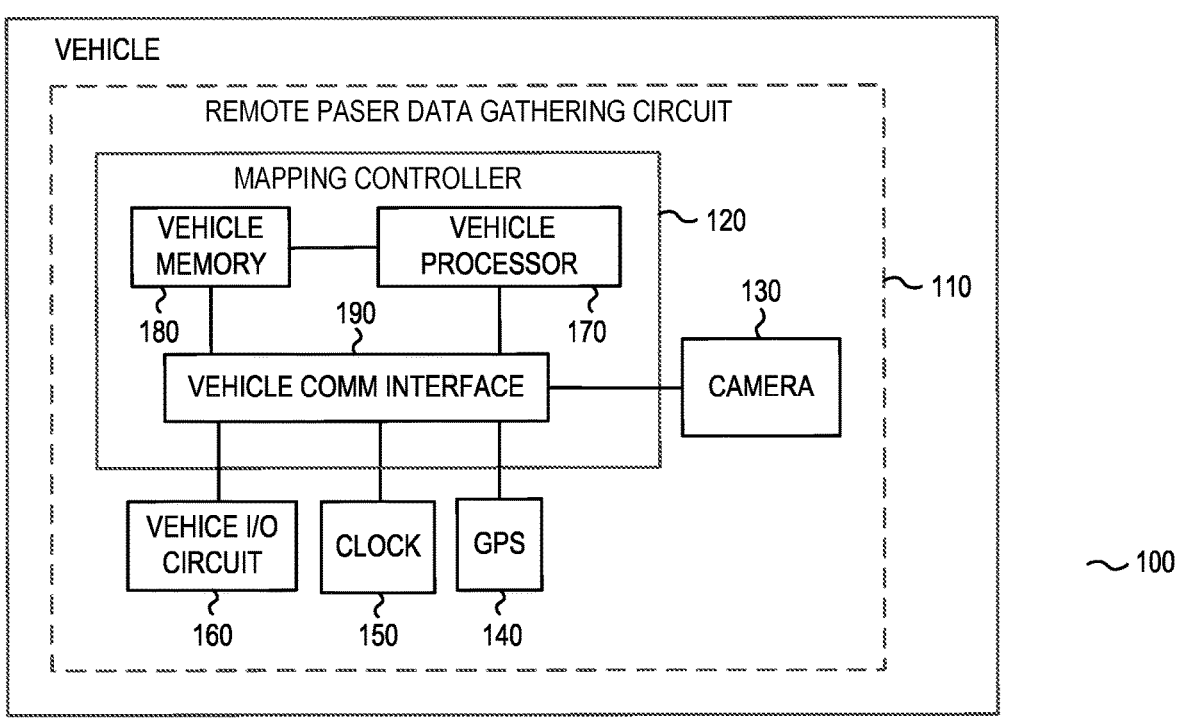
FIG. 1 is a block diagram of a vehicle with a remote Pavement Surface Evaluation and Rating (PASER) data gathering circuit according to disclosed embodiments.

The instant disclosure is provided to further explain in an enabling fashion the best modes of performing one or more embodiments of the present invention. An operation effect and a method of implementing the same according to embodiments of the present disclosure will be described with reference to the accompanying drawings, and redundant explanations will be omitted. The present disclosure may be embodied in various forms and should not be construed as being limited only to the disclosed embodiments. Rather, these embodiments are provided by way of example to make the present disclosure thorough and complete, and will fully convey aspects and features of the present disclosure to those skilled in the art. The disclosure is offered to enhance an understanding and appreciation for the inventive principles and advantages thereof, rather than to limit in any manner the invention. The invention is defined solely by the appended claims including any amendments made during the pendency of this application and all equivalents of those claims as issued.

Accordingly, processes, elements, and techniques deemed not necessary to those skilled in the art for complete understanding of aspects and features may not be described. The relative sizes of elements, layers, and regions may be exaggerated for clarity.

As used herein, the term "and/or" includes any and all combinations of one or more related listed items. The use of "may" in describing an embodiment of the present disclosure indicates "at least one embodiment of the present disclosure." In the following description of embodiments of the present disclosure, terms in the singular form may include plural forms, unless the context clearly indicates otherwise.

When one component or layer is described as "on," "connected," or "coupled" for other components or layers, "on," "connected," and "coupled" include all formed directly or by interposing one or more other components or layers. In addition, when it is disclosed that one component or a layer is "between" two components or layers, it should be appreciated that the corresponding component or layer is a single component or layer or there are one or more interposed other elements or layers.

Electric connection of two components includes not only a case where the two components are directly connected, but also a case where the two components are connected through another component interposed therebetween. Other components may include a switch, a resistor, a capacitor, and the like. In describing the embodiments, the expression "connection" means electrical connection unless there is an expression "direct connection."

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, may be supported with or in integrated circuits (ICs), such as dynamic random access memory (DRAM) devices, static random access memory (SRAM) devices, or the like. In particular, they may be implemented using CMOS transistors. It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs will be limited to the essentials with respect to the principles and concepts used by the exemplary embodiments.

PASER Data Gathering Circuit

FIG. 1 is a block diagram of a vehicle 100 with a remote Pavement Surface Evaluation and Rating (PASER) data gathering circuit 110 according to disclosed embodiments. As shown in FIG. 1, the remote PASER data gathering circuit 110 includes a mapping controller 120, a camera 130, a global positioning system (GPS) circuit 140, a clock 150, and a vehicle input/output circuit 160. The mapping controller 120 further includes a vehicle processor 170, a vehicle memory 180, and a vehicle communication interface 190.

The mapping controller 120 operates to control the various elements in the remote PASER data gathering circuit 110, to manage information received from the elements in the remote PASER data gathering circuit 110, and to coordinate communications made via the vehicle input/output circuit 160.

The camera 130 is configured to capture image data of an area of road adjacent to the vehicle 100 and provide the captured image data to the mapping controller 120. In various embodiments, this image data can be in the form of individual pictures of the road adjacent to the vehicle 100 or a continuing video of the road adjacent to the vehicle 100. In one embodiment the camera 130 takes continual video of the road adjacent to the vehicle 100 from which still images can be later extracted.

In the disclosed embodiment, the camera 130 will be attached to the front of the vehicle 100 to capture image data of an area immediately in front of the vehicle 100. However, this is by way of example only. Alternate embodiments can attach the camera 130 anywhere that it can properly capture image data of the road the vehicle 100 passes over. For example, the camera 130 could be attached to the dashboard of the vehicle 100, the back of the vehicle 100, the roof of the vehicle 100, or anywhere on the vehicle 100 from which location it can capture image data of the road.

In the disclosed embodiment, at the camera 130 is a conventional RGB camera configured to capture RGB images.

The GPS circuit 140 is configured to communicate with GPS satellites to identify a position of the vehicle 100. The GPS circuit 140 provides the current position of the vehicle 100 to the mapping controller 120 either at a regular interval or upon request. In the disclosed embodiment, the GPS circuit 140 is a conventional GPS unit.

The clock 150 is configured to monitor elapsed time and provide a current time to the mapping controller 120 either at a regular interval or upon request. In some embodiments, the clock can be a separate circuit from the mapping controller 120. In other embodiments, the clock can be a part of the vehicle processor 170 or a separate circuit inside the mapping controller 120.

The vehicle input/output circuit 160 is configured to facilitate communication between the mapping controller 120 and elements outside the remote PASER data gathering circuit 110. This interface can be used to allow the mapping controller to transfer data from the vehicle memory 180 to a device outside of the vehicle or to allow the vehicle processor to receive information or instructions. In various embodiments the vehicle input/output circuit 160 can include a wireless transmitter (e.g., Wi-Fi or Bluetooth connection), a USB connector, an HDMI connector, and Ethernet connector, or any other suitable circuit for transferring data or instructions between the mapping controller 120 and an outside device.

The vehicle processor 170 receives signals from and generates signals to control the camera 130, the GPS circuit 140, the clock 150, the vehicle input/output circuit 160, and any other circuit that provides information or requires control signals. The vehicle processor 170 also can store data to and retrieve data from the vehicle memory 180. The vehicle processor 170 can be a microprocessor (e.g., a central processing unit), an application-specific integrated circuit (ASIC), or any suitable device for controlling the operation of all or part of the remote PASER data gathering circuit 110.

The vehicle memory 180 is configured to store information and operation programs. The vehicle memory 180 can include a read-only memory (ROM), a random-access memory (RAM), an electronically programmable read-only memory (EPROM), an electrically erasable programmable read only memory (EEPROM), flash memory, or any suitable memory device.

The vehicle communications interface 190 is configured to transmit and receive communications over at least a portion of the remote PASER data gathering circuit 110. Although it is only shown in FIG. 1 as having signal lines connecting it to the vehicle processor 170, the camera 130, the GPS circuit 140, the clock 150, and the vehicle input/output circuit 160, this is simply for ease of disclosure. The vehicle communications interface 190 would also have a communication connection to any element in the remote PASER data gathering circuit 110 that requires instructions from the controller 170 or provides data to the mapping controller 120. This could include any other element within the remote PASER data gathering circuit 110 that needs instructions or provides data.

The connection implemented by the vehicle communication interface 190 could be wired or wireless between the vehicle communications interface 190 and any element in the remote PASER data gathering circuit 110. In some embodiments the connections can be a mix of wired and wireless connections.

The remote PASER data gathering circuit 110 can gather data independently of the human operator. The camera 130 can be mounted on a dashboard of the vehicle 100, on the front grill of the vehicle 100, on the roof of the vehicle 100, on the back of the vehicle 100, or anywhere that it will be able to gather image data adjacent to the vehicle 100. Multiple remote PASER data gathering circuits 110 can be provided on multiple vehicles 100 that will pass through the streets in an area for which a PASER report must be generated.

The vehicles 100 containing remote PASER data gathering circuits 110 can be specifically provided for this purpose. However, in many circumstances there will be vehicles that will already pass through the streets of a given area in the normal course of business. For example, in many municipalities, garbage trucks are provided to gather trash from the houses within the municipality. A fleet of garbage trucks are provided to gather trash from all the houses within the municipality, and this fleet of garbage trucks will therefore pass through all or almost all the streets within the municipality. Furthermore, garbage trucks typically move relatively slowly through the streets of the municipality, and many garbage trucks have a flat front that is useful for mounting a camera. Remote PASER data gathering circuits 110 can thus be placed on each garbage truck within the municipality's fleet such that this group of remote PASER data gathering circuits 110 will gather image data for all or almost all the streets within the municipality as the garbage trucks proceed through their regular rounds. If necessary, supplemental vehicles can be sent out to gather image data of any streets not covered by the garbage trucks.

In alternate embodiments, the garbage trucks could be replaced with recycling trucks, utility trucks, police cars, ambulances, fire trucks, or any municipal vehicle. Garbage trucks and recycling trucks offer a particular advantage in the fleets of such vehicles typically pass through the entirety of a municipality over the course of a week or two. However, even embodiments that employ vehicles that do not canvas the entire municipality can offer benefit. If a fleet of municipal vehicles covers a majority of the streets in the municipality over a set period of time, dedicated vehicles may be provided to fill in the gaps missed by the municipal fleet. Although this would require the use of one or more dedicated vehicles, such dedicated vehicles would only have to cover a portion of the streets in the municipality. Furthermore, these dedicated vehicles would merely have to drive through the streets that were not covered by the municipal fleet. The drivers or passengers would also not be required to gather any data or stop the vehicles to take pictures since image data is gathered automatically.

Figure 2:
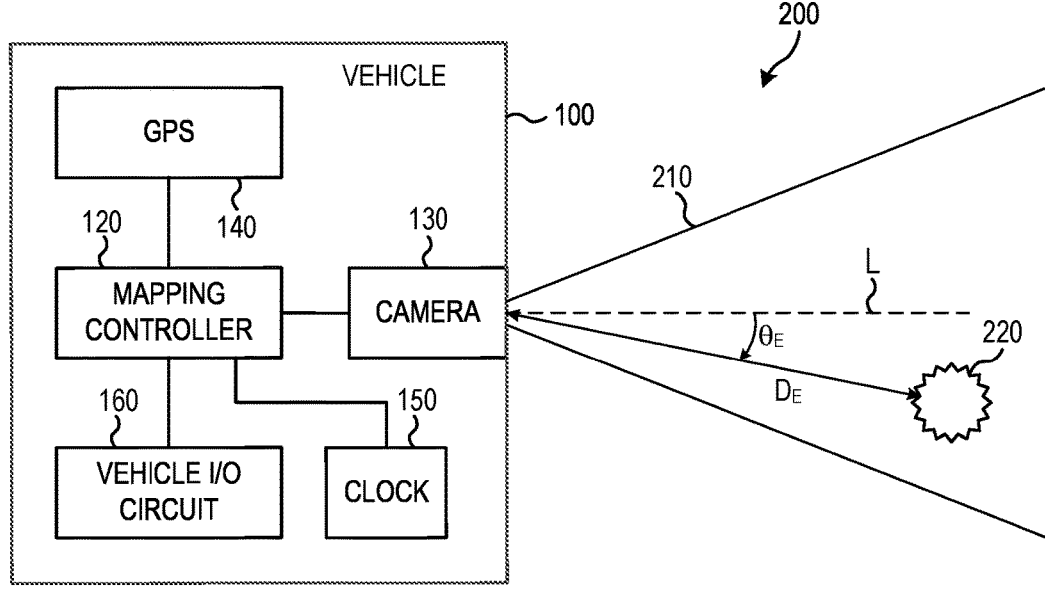
FIG. 2 is a block diagram of a vehicle employing the remote PASER data gathering circuit of FIG. 1 according to disclosed embodiments.

FIG. 2 is a block diagram of a vehicle 100 employing the remote PASER data gathering circuit 110 of FIG. 1 according to disclosed embodiments. As shown in FIG. 2, the camera 120 captures a road image in a camera view 210. This road image can include a feature-of-interest 220 (e.g., a road defect) on the road in front of vehicle 100.

A feature-of-interest 220 represents a variety of potential surface defects on the road such as cracks, patches, potholes, utility repairs, or the like. Cracks can include transverse cracks, longitudinal cracks, alligator cracks, and block cracks. Patches can include crack patches and pothole patches.

For each image taken in a camera view 210, the remote PASER data gathering circuit 110 will gather some associated data that can be connected with the given image. For example, the GPS circuit 140 can identify a GPS location of the vehicle 100 at the time that the given image was taken. Likewise, the clock 150 can identify a time at which the given image was taken.

For each road image taken in a camera view 210 in which a feature-of-interest 220 is present, the known parameters of the camera will allow a processor to determine certain physical parameters of the feature-of-interest 220. For example, an analysis of the image taken by camera 130 can show a distance DE from the camera to the feature-of-interest 220 and angle $\theta E$ of the feature-of-interest 220 with respect to a reference line L. In some embodiments, the reference line L can be the direction of movement of the vehicle 100. However, this is by way of example only. Alternate embodiments could use any desirable and known reference line L.

The information from the camera 130 can be used in conjunction with the GPS location of the vehicle 100 to determine an estimated GPS location of the feature-of-interest 220. The values for the distance DE and angle $\theta E$ can be used to adjust the GPS location of the vehicle 100 to generate the estimated GPS location of the feature-of-interest 220.

Figure 3:
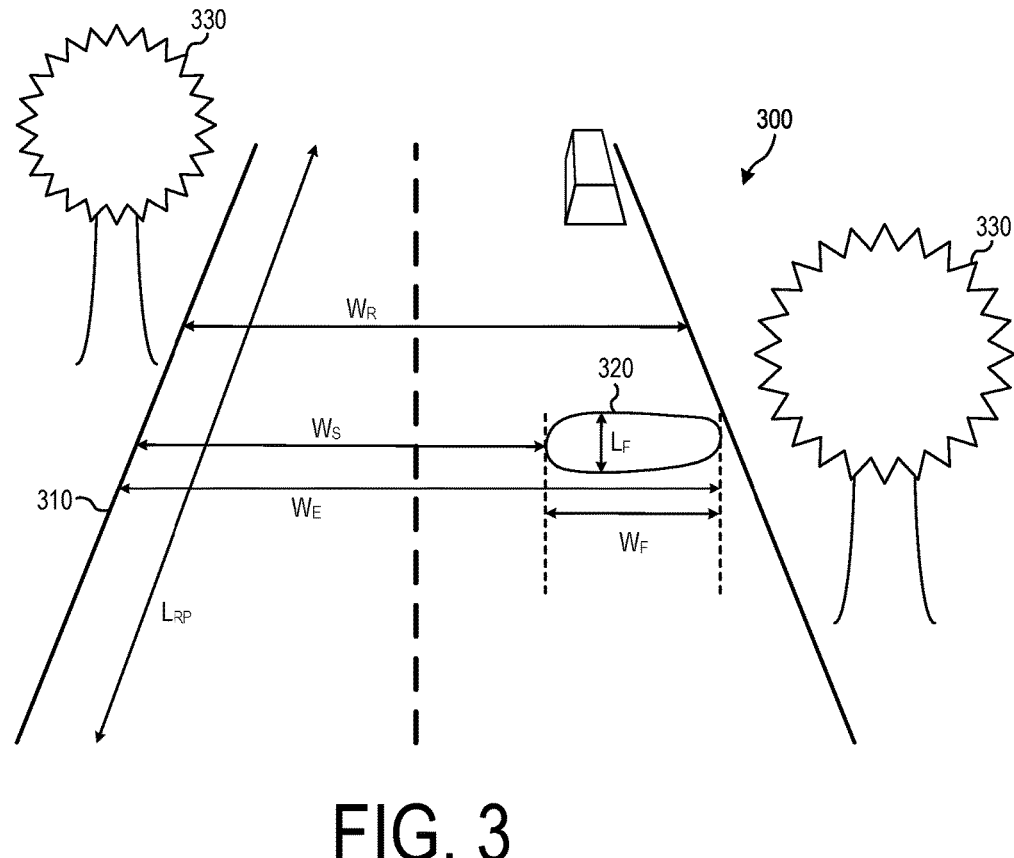
FIG. 3 is a diagram of an image from a camera in a remote PASER data gathering circuit according to disclosed embodiments.

FIG. 3 is a diagram of a road image 300 from a camera 130 in a PASER data gathering circuit 110 according to disclosed embodiments. This road image 300 corresponds to an image taken in the camera view 210 as shown in FIG. 2.

As shown in FIG. 3, the road image 300 is of a road 310 that contains a feature-of-interest 320 (e.g., a road defect).

Although only a single feature-of-interest 320 is shown in FIG. 3, this is by way of example only. Other road images may contain either no road defects 320 or multiple features-of-interest 320.

Since the parameters of the camera 130 are known, the road image 300 can be analyzed to identify features of the road image 300, including the dimensions of the road 310, the dimensions of the feature-of-interest 320, and the relative position of the feature-of-interest 320 on the road 310. This can be achieved by measuring distances on the road image 300 and adjusting them based on the scale of the image. The feature-of-interest 320 corresponds to the feature-of-interest 220 of FIG. 2 and represents a potential surface defect on the road such as a crack, a patch, a pothole, a utility repair, or the like.

For example, the road image 300 can be analyzed to determine a road width WR of the road 310, a starting width WS of the feature-of-interest 320 with respect to a first side of the road 310, an ending width WE of the feature-of-interest 320 with respect to the first side of the road 310, a feature width WF of the feature-of-interest 320, a road portion length LRP of the portion of the road 310 captured by the image 300, and a feature length LF of the feature-of-interest 320. In some embodiments the feature width WF can be directly measured; in other embodiments, the feature width WF can be determined by subtracting the ending width WE from the starting width WS.

By determining the road width WR and the road portion length LRP, it is possible to estimate a total area of the road portion captured by the road image 300. By determining the feature width WF and the feature length LF, it is possible to estimate a total area of the feature-of-interest 320. It is then possible to use the estimated total area of the feature-of-interest 320 and the estimated total area of the road portion captured by the road image 300 to determine the percentage of the road portion covered by the feature-of-interest 320. In situations in which multiple features-of-interest 320 are present on the road portion, the total area of the features-of-interest 320 can be used to determine a percentage of the road portion covered by features-of-interest 320. Furthermore, although the feature-of-interest 320 may not be rectangular, the feature width WF and feature length LF can be used to make a reasonable estimate of the area of the feature-of-interest 320. In some embodiments, irregularly shaped features-of-interest can be accounted for by first estimating the area of a bounding box (i.e., a rectangle that encloses the irregular feature-of-interest) and then subtracting a correction area from the rectangular area based on the actual pixels of the feature-of-interest within the bounding box.

In addition, some features-of-interest 320 may not have an area, but only a length. For example, a crack may only have a length and not a width. In such case, the image can be analyzed in a known manner to estimate the length of the feature-of-interest 320 alone. In the case of a diagonal crack, the length and width of the crack with respect to a reference direction (e.g., the moving direction of the vehicle) can be measured and the length of the feature-of-interest 320 determined using the known relationship between length, width, and diagonal distance.

Multiple Vehicle Issues

In a typical use of the remote PASER data gathering circuit 110, such a circuit will be placed on multiple vehicles in a municipal fleet. This leads to the possibility that different vehicles will capture images of the same portion of road, or the same vehicle will capture multiple images of the same portion of road. Even if different vehicles are assigned to pass through different areas of the town, and even if a given vehicle moves as efficiently as it can through its assigned route, some portions of road will inevitably receive greater coverage and multiple images will be captured of those portions of road. For example, many vehicles may travel along the same main thoroughfare to get to individual neighborhoods. Likewise, even a single vehicle may pass over the same stretch of road both heading out to its designated area of operation from a central location and returning back to that central location.

Figures 4A, 4B, 4C:
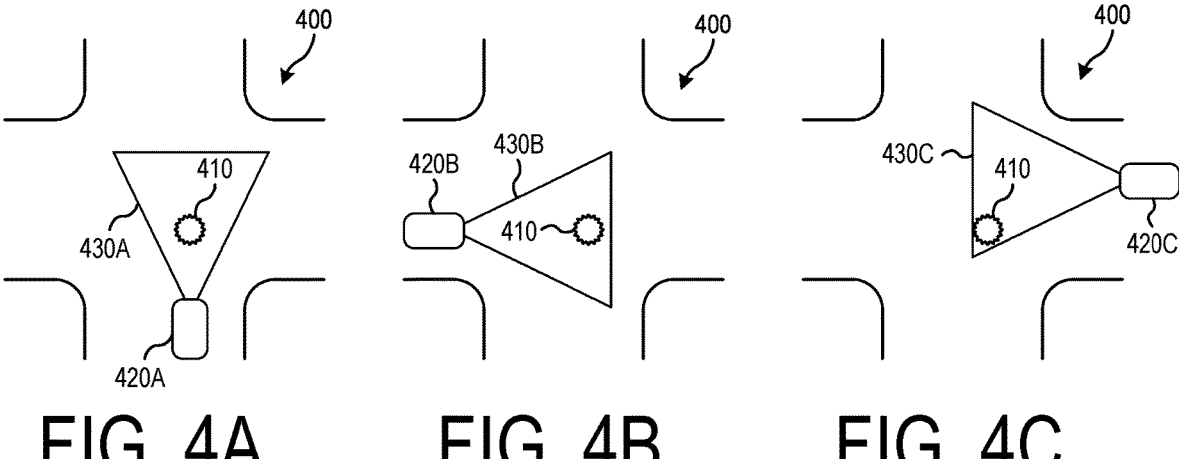
FIGS. 4A-4C are diagrams of multiple images of the same feature-of-interest taken from the same camera or different cameras in one or more remote PASER data gathering circuits according to disclosed embodiments.

FIGS. 4A-4C are diagrams of multiple images of the same feature-of-interest 410 taken from the same camera or different cameras in one or more remote PASER data gathering circuits 110 according to disclosed embodiments. As shown in FIGS. 4A-4C, an intersection 400 contains a single feature-of-interest 410. As noted above, this feature-of-interest 410 could be a pothole, a crack, a patch, a utility repair, or any kind of other defect in the road.

As shown in FIG. 4A, a first vehicle 420A may approach the intersection from the south and capture a road image containing the feature-of-interest 410 in a first camera image 430A; a second vehicle 420B may approach the intersection from the west and capture a road image containing the feature-of-interest 410 in a second camera image 430B; and a third vehicle 420C may approach the intersection from the east and capture a road image containing the feature-of-interest 410 in a third camera image 430C. The first, second, and third vehicles 420A-420C may be the same vehicle or different vehicles in this example.

Regardless of the identity of the vehicles, this situation can result in the totality of road images gathered including multiple road images that contain the same feature-of-interest 410. It is desirable to provide a way to recognize that this is the same feature-of-interest so that in a PASER analysis, the feature-of-interest 410 is counted only as a single feature-of-interest and not multiple features-of-interest. This can be achieved by monitoring the class of each feature-of-interest, the dimensions of each feature-of-interest, the time that the camera images 430A-430C are captured and the location of the feature-of-interest 410 in each camera image 430A-430C. By comparing the classes, dimensions, times of capture, and locations, it is possible to identify that which feature-of-interest in the images are the same feature-of-interest and which images are different features-of-interest.

Image Capture

Figures 5, 6:
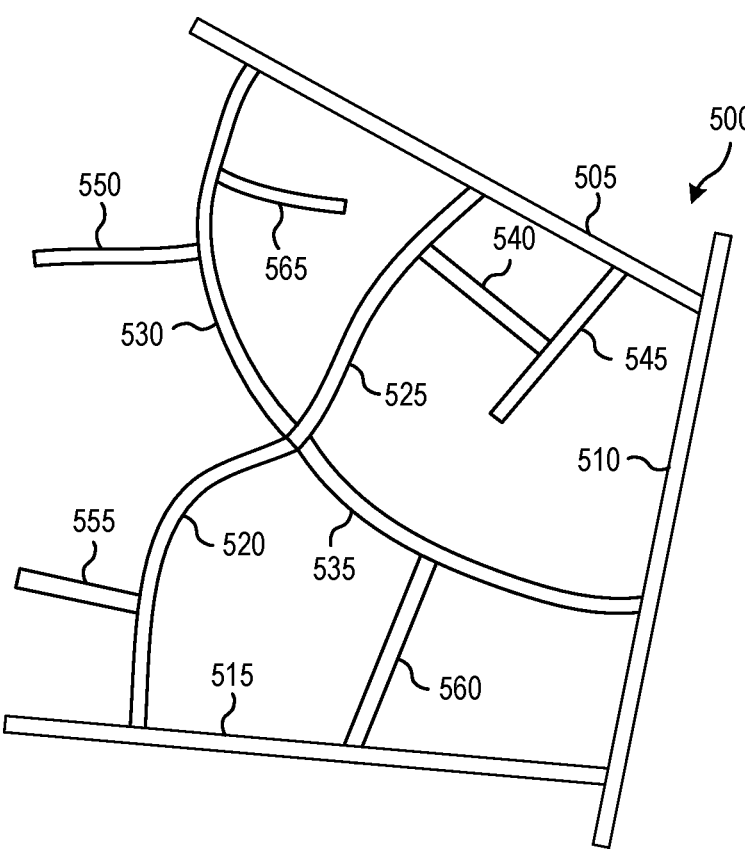
FIG. 5 is a diagram of a portion of area map with street segments according to disclosed embodiments.
FIG. 6 is a diagram of a street segment from the area map of FIG. 5 according to disclosed embodiments.

PASER analysis is preferably performed for all or virtually all the streets in a municipality or other area for which a PASER report is desired. FIG. 5 is a diagram of a portion of area map 500 with street segments 505-565 according to disclosed embodiments.

As shown in FIG. 5, the portion of the area map 500 represents the streets within a portion of a greater municipality. This portion of the area map 500 may represent an area in which a given vehicle is set to operate. The portion of the area map 500 is divided into multiple street segments 505-565. Each street segment 505-565 represents the entire length of a street or a portion of a street between two intersections. In the embodiment of FIG. 5, not every intersection represents the endpoint of a street segment. For example, intersections with some small streets or cul-de-sacs do not form street segment end points. However, this is by way of example only. In some embodiments all intersections may represent end points of street segments.

Although the cameras 130 in the remote PASER data gathering circuits 110 gather image data of the streets regardless of how the area map is divided up, the image data can be divided by street segment, allowing a resulting PASER report to provide PASER values according to street segments.

FIG. 6 is a diagram of a street segment 525 from the area map of FIG. 5 according to disclosed embodiments. As shown in FIG. 6, the street segment 525 includes five features-of-interest 620A-620E. For ease of disclosure, these features-of-interest 620A-620E can be referred to generically as features-of-interest 620.

These features-of-interest 620 are analogous to the feature-of-interest 220, 320, 410 in FIGS. 2-4 and each represent a pothole, a crack, a patch, a utility repair, or any kind of other defect in the road segment 525. Although five features-of-interest 620A-620E are disclosed in FIG. 6, this is by way of example only. Each road segment, may have any number of feature-of-interest 620 or no features-of-interest 620 based on what the image data for that road segment reveals.

In analyzing each road segment, a system will determine a closest distance between each feature-of-interest 620 and a next closest feature-of-interest 620. For example, in the embodiment of FIG. 6, in which five features-of-interest 620A-620E are identified, four distances D1-D4 are determined. Distance D1 represents a closest distance between features-of-interest 620A and 620B; distance D2 represents a closest distance between features-of-interest 620B and 620C; distance D3 represents a closest distance between features-of-interest 620C and 620D; and distance D4 represents a closest distance between features-of-interest 620D and 620E.

In some embodiments, distances will only be determined between features-of-interest 620 that are of the same type. In this way a map similar to that shown in FIG. 6 could be generated for a given road segment for each class of feature-of-interest 620. For example, one map could show all the potholes on a given road segment and the closest distances between nearby potholes; another map could show all of the cracks on a given road segment and the closest distances between nearby cracks. Similar maps could be generated for each different class of feature-of-interest 620.

Central Circuit

As shown above, disclosed remote PASER data gathering circuit 110 can be installed on one or more vehicles 100 that will pass through the streets of an area (e.g., a municipality) and will gather image data of the streets in that area (e.g., a collection of road images). Once the vehicles 100 complete gathering the image data, this image data can be provided to a main controller for that will use the image data to generate a PASER report for that area survey.

Figures 7, 9:
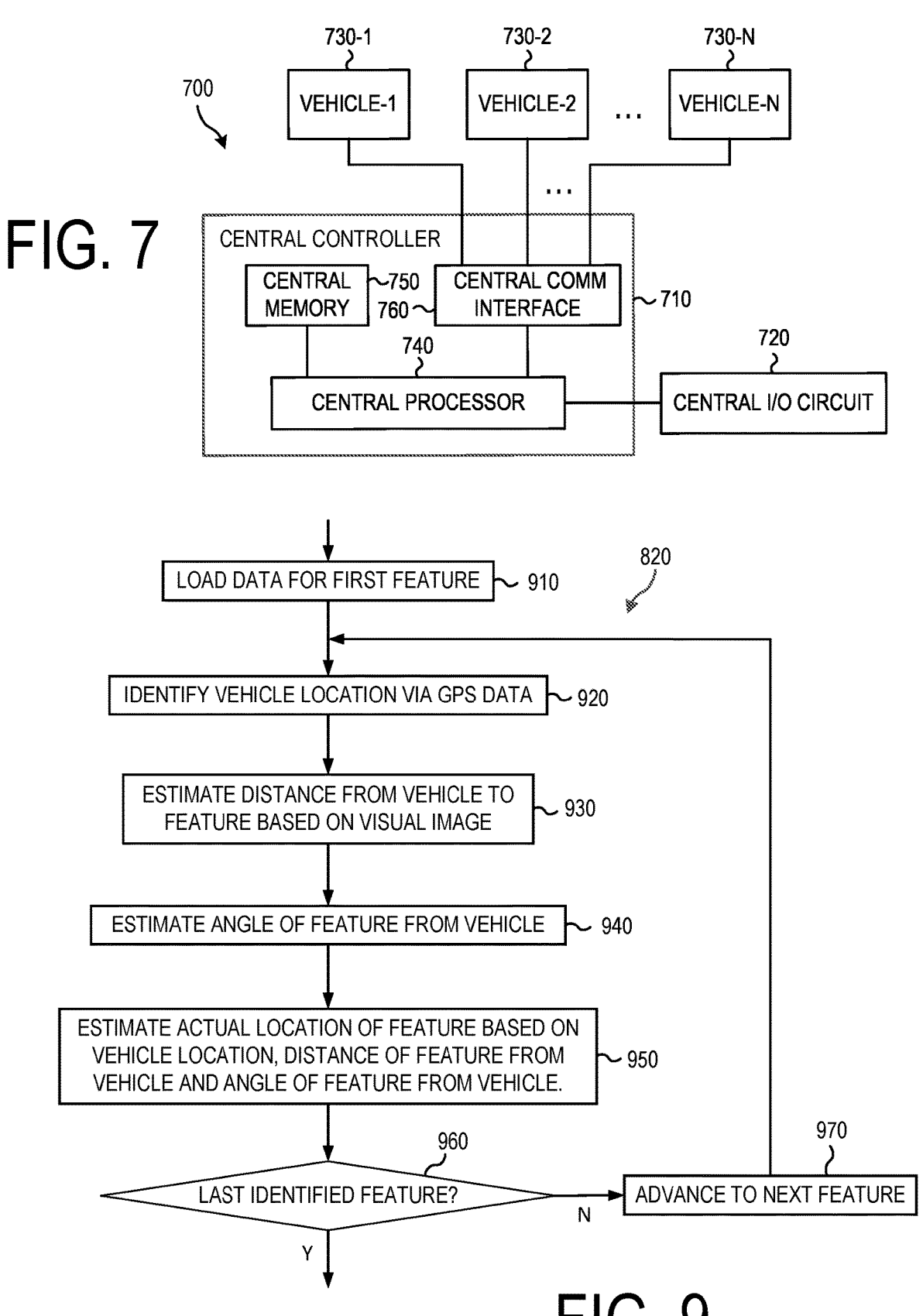
FIG. 7 is a diagram of a central circuit including a central controller communicating with one or more vehicles according to disclosed embodiments.
FIG. 9 is a flowchart showing the calculation of an actual location for a detected feature-of-interest according to disclosed embodiments.

FIG. 7 is a diagram of a central circuit 700 including a central controller 710 communicating with one or more vehicles 730-1, 730-2, . . . 730-N according to disclosed embodiments. As shown in FIG. 7, the central circuit 700 further includes a central input/output circuit 720. The central controller 710 includes a central processor 740, a central memory 750, and a central communication interface 760.

The central controller 710 operates to manage information received from the one or more vehicles 730-1, 730-2, . . . 730-N, provide any instructions necessary to the one or more vehicles 730-1, 730-2, . . . 730-N, and to coordinate communications made via the central input/output circuit 720.

The central input/output circuit 720 allows an operator to provide data to and receive information from the central controller 710. In addition, the central input/output circuit 720 allows a PASER report to be retrieved from the central controller 710 after it is generated. In various embodiments, the central input/output circuit 720 can include a touchpad, a keyboard, a display with touch buttons, a USB connection, an Ethernet connection, a wireless connection (e.g., Wi-Fi, Bluetooth, etc.), or any suitable device for allowing communication between the central controller 710 and an operator. In some embodiments of the central input/output circuit 720 can connect to the Internet.

The one or more vehicles 730-1, 730-2, . . . 730-N represent vehicles such as are described with respect to FIG. 1. Each of the one or more vehicles 730-1, 730-2, . . . 730-N includes a remote PASER data gathering circuit 110 that gathers image data from roads that the respective vehicle 730-1, 730-2, . . . 730-N has driven over. Each of the vehicles 730-1, 730-2, . . . 730-N includes a vehicle input/output circuit 160 configured to communicate with the central communication interface 760 to pass the gathered image data from the vehicle 730-1, 730-2, . . . 730-N to the central controller 710.

The central processor 740 receives signals from and generates signals to the one or more vehicles 730-1, 730-2, . . . 730-N and any other element in the central circuit 700 that provides information or requires control signals. The central processor 740 is also configured to store data to and retrieve data from the central memory 750. The central processor 740 can be a microprocessor (e.g., a central processing unit), an application-specific integrated circuit (ASIC), or any suitable device for controlling the operation of all or part of the central controller 710.

The central memory 750 is configured to store information and operation programs. The central memory 750 can include a read-only memory (ROM), a random-access memory (RAM), an electronically programmable read-only memory (EPROM), an electrically erasable programmable read only memory (EEPROM), flash memory, or any suitable memory device.

The central communications interface 760 is configured to transmit and receive between the central controller 710 and the one or more vehicles 730-1, 730-2, . . . 730-N. Although it is only shown in FIG. 7 as having signal lines connecting it to the central processor 740, and the one or more vehicles 730-1, 730-2, . . . 730-N, this is simply for ease of disclosure. The central communications interface 760 would also have a communication connection to any element in the central controller 710 or the central circuit 700 in general that requires instructions or provides data.

The connection implemented by the central communication interface 760 could be wired or wireless between the communications interface 760 and any element in the central circuit 700. In some embodiments the connections can be a mix of wired and wireless connections.

System Operation

FIG. 8 is a flowchart showing an operation 800 of generating a PASER report according to disclosed embodiments. The PASER report is generated for a given road system and includes individual PASER ratings for all or most of the road segments within the road system.

As shown in FIG. 8, operation begins by collecting road data (805). This road data can include a plurality of images of a road, a plurality of videos of a road, or a mix of images and videos of a road. In one embodiment, the road data is continual video data from which still images can be taken. The collected road data should provide image or video data for all or most of the roads of the road system. In one disclosed embodiment, the image data is primarily video data taken at 24 frames per second. However, this is by way of example only. Images can be taken at any regular interval desired, or even at irregular intervals in some embodiments.

In some embodiments different vehicles may use different intervals for obtaining individual images. In other embodiments, the number of frames per second used to capture road data can be modified based on other parameters such as the speed of the vehicle. A vehicle moving at a relatively faster speed may need to capture more frames per second than a vehicle moving at a relatively slower speed.

In addition to still or video images, the image data can include information indicating the time each still image or image frame was taken, or a reference time to allow such individual times to be calculated. Likewise, the image data can include GPS location data indicating where a respective vehicle was located each time an image or an image frame was taken.

The collection of the road data also includes providing the image data from all the vehicles that obtained image data to a central repository (e.g., a central circuit) for processing.

Once the data is collected, a set of detection data is created based on the collected road data (810). The detection data is created by running the road data through a machine learning model to detect features-of-interest of all or most of the roads/road segments in the road system. In this operation, each detected feature-of-interest is entered into the detection data and associated with a class to categorize it.

The class is a short description of a kind of feature-of-interest that is used organize the detection data. In various embodiments the classes may include: surface defects, cracks, patches, potholes, and utility repairs. Cracks can be further divided into transverse cracks, longitudinal cracks, alligator cracks, and block cracks. Patches can be further divided into crack patches and pothole patches. However, this list is exemplary only. More or fewer classes can be used in other embodiments.

Once the detection data is created and all features-of-interest are identified along with class names for each of them, the surface area of each of the identified features-of-interest are estimated (815). This surface area can be an area for features-of-interest that exist in two dimensions (e.g., patches, potholes, pothole utility repairs) or a length for features-of-interest that exist in one dimension (e.g. cracks or crack utility repairs).

The surface area for each of the identified features-of-interest is obtained by visual estimation techniques based on the image data (e.g., road images) containing a corresponding identified feature-of-interest. This can include the techniques described above with respect to FIG. 3. In addition, the surface area of the road portion within each road image is likewise calculated using visual estimation techniques.

Once the surface area for the road portion and for each of the identified features-of-interest in a given road image is determined, the total area of features-of-interest is compared against the surface area of the road portion to obtain a surface area estimation ratio for each set of road data (i.e., each instance of detection data). This surface area estimation ratio is an indication of the percentage of the surface area of the road portion that is filled with features-of-interest.

Once the surface area of the detection data is estimated, a location for all the detection data is calculated (820). This involves generating an estimated GPS location for each feature-of-interest identified within the road image. This estimation can involve modifying the actual GPS location of the vehicle when the road image was taken based on parameters determined from an analysis of an associated road image. This can include the techniques described above with respect to FIG. 2.

Once each identified feature-of-interest has been provided with an estimated GPS location, an identification is assigned to all pieces of detection data relating to the same feature-of-interest (825). This involves examining each feature-of-interest to determine if any are duplicates of each other.

The identification of duplicate features-of-interest can be achieved by examining the classes identified for the features-of-interest, the determined dimensions of the features-of-interest, the time each feature-of-interest was identified, and the estimated GPS location of each feature-of-interest. Individual features-of-interest that are estimated as being of the same class, the same size, and in the same location can be determined to be the same feature-of-interest appearing in separate road images.

When considering features-of-interest from images gathered from a single vehicle, the time at which the road image was obtained may also be used to help determine whether the identified features-of-interest are the same or different. Since GPS data is typically only accurate to about 16 feet, two different features-of-interest might be identified as having the same GPS location, even when they are located a few feet apart. Therefore, features-of-interest identified in road images taken by a camera on the same vehicle can be further distinguished by examining the time at which the road images were taken that contain the similar features-of-interest. If the road images were taken at times very close to each other, they may be considered the same feature-of-interest. However, if the road images were taken at times significantly different from each other, they may be considered different features-of-interest. The exact parameters for how close the times of the taking of the road images must be for similar features-of-interest to be considered the same feature-of-interest will vary in different embodiments. In some embodiments, the time threshold for combining detections is between 5 and 15 seconds, more preferably 8-12 seconds, and most preferably 10 seconds to account for the case where two features-of-interest are within 16 feet of each other (the approximate accuracy of GPS locations).

After properly identifying all features-of-interest in the detection data, the system generates combined detection data in which multiple instances of features-of-interest with the same class, estimated GPS location, and estimated surface area ratio are grouped together into a single data point for calculation purposes. In various embodiments, the data for the identified features-of-interest that are determined to represent the same feature-of-interest can be stored together as connected data or can be averaged in an acceptable manner to provide measurements that represent a combination of the individual measurements.

Once the features-of-interest have been identified to determine which are the same, the positions of each of the features-of-interest on a corresponding road are determined (830). This can be achieved by analyzing a road image containing the feature-of-interest and determining both a starting position on the road and ending position on the road of the feature-of-interest with respect to a reference side of the road. An example of this can be seen in FIG. 3 above, which shows how a starting width WS and an ending width WE can be determined for a feature-of-interest 320. By knowing the starting width and ending width for a feature-of-interest with respect to a reference side of the road, the position of the feature-of-interest can be determined.

Taken in conjunction with the GPS location for the feature-of-interest, this information allows the system to make estimate as to the position of the feature-of-interest on the road in the road system. The GPS location will show where along the length of the road the feature-of-interest is located; and the starting width and ending width will show where along the width of the road the feature-of-interest is located.

Once the road position of each feature-of-interest is determined, the unique features-of-interest contained in the combined detection data are each assigned to a road segment in the road system that corresponds to its estimated GPS location (835). The system will have stored in memory the parameters for each of the road segments in the road system, including the GPS locations that correspond to that road segment. By comparing the estimated GPS locations of each individual feature-of-interest, each of the features-of-interest can be assigned to a corresponding road segment.

Once each feature-of-interest has been assigned to a corresponding road segment, a distance is calculated between each feature-of-interest in a road segment and the next closest feature-of-interest on that same road segment that has the same identified class. For example, if a feature-of-interest were identified as a pothole, a distance would be calculated between that feature-of-interest and the next closest feature-of-interest in the same road segment that was also identified as a pothole.

This operation will generate information like that shown in FIG. 6 above for each class of feature-of-interest. In other words, one data set for a given road segment would be generated indicating the closest distances between all the potholes on that road segment; and another data set would be generated indicating the closest distances between all the cracks on that road segment. Similar data sets could be generated for all possible classes of feature-of-interest. Such data sets would be generated for every road segment. If no features-of-interest is identified for a given class on a given road segment, either no data set would be generated or a null data set could be generated that indicates that no feature-of-interest of that class is present on the corresponding road segment.

The information gathered and determined in operations 805-840 can be considered derived data. This derived data includes a separate class data set for each combination of road segment and type of class of feature-of interest. For example, each road segment would have a data set for potholes, a data set for cracks, a data set for patches, and so forth. Each class data set can include a class detection-count, a class total surface-area-estimate-ratio, a class average surface-area-estimate-ratio, a class smallest nearest-sibling-distance, a class average nearest-sibling-distance, and a class largest nearest-sibling-distance.

The class detection-count represents a total number of features-of-interest of the associated class within the given road segment. The class total surface-area-estimate-ratio represents the total of all surface area estimate ratio values for all unique features-of-interest associated with the corresponding road segment. The class average surface-area-estimate-ratio represents an average of the surface area estimate ratio values of all unique features-of-interest associated with the corresponding road segment. The class smallest nearest-sibling-distance represents the smallest of the closest distances between any unique feature-of-interest and its next nearest unique feature-of-interest associated with the road segment. The class average nearest-sibling-distance represents the average of all the closest distances between unique features-of-interest and the next nearest unique feature-of-interest associated with the road segment. The class largest nearest-sibling-distance represents the largest of the closest distances between any unique feature-of-interest and its next nearest unique feature-of-interest associated with the road segment.

These data sets associated with the road segments are then compared with similar data from one or more previously generated PASER reports that include PASER values associated with given road segments. These previously generated PASER reports can be from the same road system or from different road systems. By comparing the observed and determined parameters noted above with comparable parameters in existing PASER reports it is possible to correlate road segments in the current road system with road segments in the road system or systems analyzed by the existing PASER report or reports. Since each of the road segments in the existing PASER report or reports has an associated PASER value, each road segment can be assigned a similar PASER value as the road segments from the existing PASER report that best correspond with the road segment in the data to be analyzed. In this way, each road segment can be assigned an estimated PASER value that corresponds with the observed quality of the road segment.

The exact way in which the data sets for each road segment are compared to similar parameters in an existing PASER report or reports can vary across different embodiments. In one embodiment, one or more PASER reports can be analyzed to determine the expected ranges of values for different features-of-interest. Corresponding values for the different features-of-interest can then be compared to the values from the accumulated data from previous PASER reports to see what PASER ratings they correspond to for the various features-of-interest.

For example, the accumulated data from previous PASER reports might show that road segments rated at PASER 2 have between 26% and 37% of their surface area as potholes, with corresponding ranges of pothole surface area percentage corresponding to other PASER values. If a road segment in the gathered data has 32% surface area as potholes, it would be estimated to have a PASER rating of 2 based on potholes.

A similar analysis can then be performed for each other possible feature-of interest and a similar PASER rating estimate can be provided for each feature-of-interest. For example, comparison of the gathered data with the accumulated data from previous PASER reports may indicated that based on potholes a road segment should have a PASER rating of 2, based on cracks it should have a PASER rating, of 5, based on pothole patches it should have a PASER rating of 4, etc. Since a road segment is typically given its PASER rating based on the most severe damage it has, the system will therefore typically determine the final PASER rating for a given road segment based on the lowest estimated PASER rating for all the features-of-interest in the road segment.

It is possible, however, that an operator might include special rules to adjust this general rule. For example, an operator might determine that despite previous PASER ratings, a segment with a single pothole that covers less than 5% of the road segment will have a minimum PASER rating of 4. Multiple special rules can be made based on expert knowledge, trial and error, etc.

Alternate ways of analogizing a given data set for a road segment to a road segment in an existing PASER report are also possible.

Once estimated PASER values have been assigned to each of the road segments, the estimated PASER values for each of the road segments can be collected into a single map, table, or database, and a final PASER report can be generated based on this data.

FIG. 9 is a flowchart showing an operation (820) of calculating an actual location for a detected feature-of-interest according to disclosed embodiments.

As shown in FIG. 9, the operation begins by loading data for a first feature-of-interest as a current feature-of-interest (910).

The system then identifies a vehicle GPS location associated with the road image associated with that feature-of-interest (920). This road image represents an actual GPS location of the vehicle when the camera attached to that vehicle took the road image that contains the current feature-of-interest.

The system then estimates distance from the vehicle to the current feature-of-interest based on the road image containing the current future-of-interest (930). Since the parameters of the camera that took the road image are known (e.g., pixel size, position of camera, angle of camera, etc.), measurements from the road image can be used to estimate this distance.

Once the distance from the vehicle of the current feature-of-interest is estimated, an angle is estimated from which the closest line between the vehicle and current feature-of-interest deviates from a reference line. In some embodiments this reference line will be the direction of travel of the vehicle. However, this is only by way of example. Alternate embodiments could use any known reference line.

Again, since the parameters of the camera that took the road image are known, measurements from the road image can be used to estimate the angle of deviation of the closest line between the vehicle and current feature-of-interest from the reference line.

Once the deviation angle of the current feature-of-interest is determined the system estimates actual location of the future based on the vehicle GPS location, the distance of the future from the vehicle, and the angle of deviation of the closest line between the vehicle and the current feature-of-interest from the reference line. An example of how this can be done is shown in FIG. 2 above.

After estimating a location for the current feature-of-interest, the system then determines whether the current feature-of-interest is the last feature-of-interest that needs to be considered (960).

If the current feature-of-interest is the last feature-of-interest that needs to be considered, then the operation ends. If, however, the current feature-of-interest is not the last feature-of-interest that needs to be considered, then the operation advances to the next feature-of-interest (970) and returns to the operation of identifying the vehicle location via GPS data (920) and continues processing from there.

In this way, all necessary features-of-interest can be assigned an estimated location.

FIG. 10 is a flowchart showing an operation (825) of assigning identification to all detection data relating to the same feature-of-interest according to disclosed embodiments.

As shown in FIG. 10, the operation begins by loading data for a first feature-of-interest as a current feature-of-interest (1010).

The system then identifies the location of the current feature-of-interest (e.g., as determined in operation 820 above) (1020) and identifies the time at which the road image containing the current feature-of-interest was captured (1030).

The system then determines whether other features-of-interest detected by the same vehicle are the same or unique features-of-interest (1040). This can be done by comparing the class of the current feature-of-interest with the class of the other features-of-interest detected by the same vehicle, comparing the location of the current feature-of-interest with the location of the other features-of-interest detected by the same vehicle, comparing the respective times at which the road images containing the current feature-of-interest and the other features-of-interest were captured, and comparing the physical parameters (e.g., length, width, etc.) of the current feature-of-interest and the other features-of-interest.

The system then determines whether other features-of-interest detected by different vehicles are the same or unique features-of-interest (1050). This can be done by comparing the class of the current feature-of-interest with the class of the other features-of-interest detected by the different vehicles, comparing the location of the current feature-of-interest with the feature of the other features-of-interest detected by the different vehicles, and comparing the physical parameters (e.g., length, width, etc.) of the current feature-of-interest and the other features-of-interest.

After determining whether the current feature-of-interest is the same as other features-of-interest identified by the same or different vehicles or is a unique feature-of-interest, the system then determines whether the current feature-of-interest is the last feature-of-interest that needs to be considered (1060).

If the current feature-of-interest is the last feature-of-interest that needs to be considered, then the operation ends. If, however, the current feature-of-interest is not the last feature-of-interest that needs to be considered, then the operation advances to the next feature-of-interest (1070) and returns to the operation of identifying location of the current feature-of-interest (1020) and continues processing from there.

In this way, it is possible to identify which features-of-interest are the same and which are unique.

Figures 11, 12:
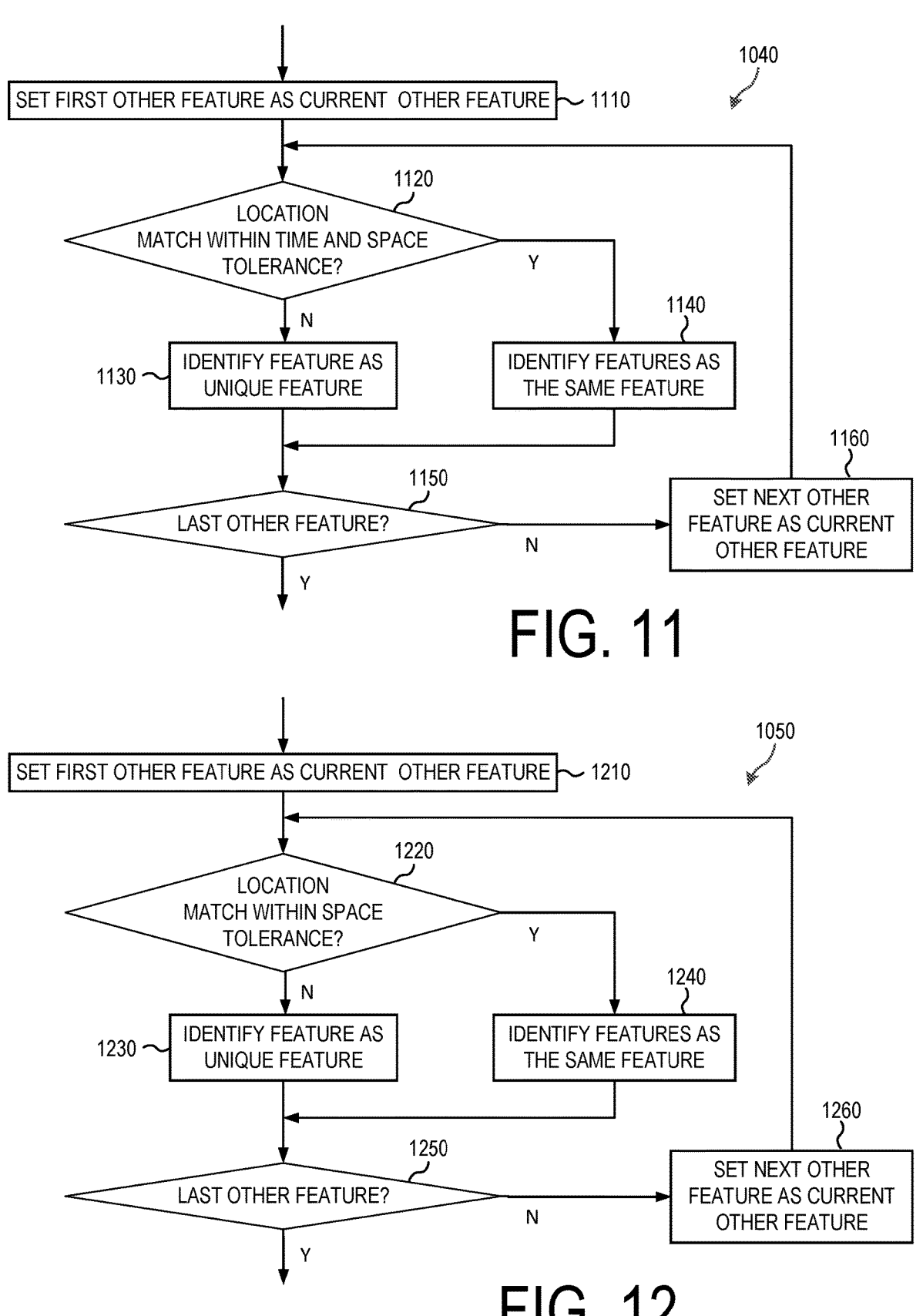
FIG. 11 is a flowchart showing an operation of determining if features detected by the same vehicle are the same or unique according to disclosed embodiments.
FIG. 12 is a flowchart showing an operation of determining if features detected by different vehicles are the same or unique according to disclosed embodiments.

FIG. 11 is a flowchart showing an operation (1040) of determining if features detected by the same vehicle are the same or unique according to disclosed embodiments.

As shown in FIG. 11, operation begins by setting a first other feature-of-interest as a current other feature-of-interest (1110). The system will have available all the class, time, space, and dimension information about both the current feature-of-interest and the current other feature-of-interest.

The system will then determine whether the locations of the current feature-of-interest and the current other feature-of-interest matches within a time tolerance and a space tolerance (1120). The time and space tolerances can be determined by a trial-and-error or assigned based on expert knowledge. The two features-of-interest will be determined to not be in the same location if either the difference in time does not fall within the time tolerance or the difference in location does not fall within the space tolerance. In one embodiment the distance tolerance can be between 1-4 meters, more preferably 2-3 meters. This value may change based on the accuracy of the GPS locations used. In one embodiment the time tolerance can be between 10 and 20 seconds, more preferably between 13 and 17 seconds, most preferably 15 seconds.

If the system determines that the locations of the current feature-of-interest in the current other feature-of-interest do not match in either time or space, then the system identifies the current feature-of-interest as a unique feature-of-interest (1130).

If, however, the system determines that the locations of the current feature-of-interest in the current other feature-of-interest do match in both time and space, then the system identifies the current feature-of-interest as the same feature-of-interest (1140).

After determining whether the current feature-of-interest is the same as the current other feature-of-interest, the system then determines whether the current other feature-of-interest is the last other feature-of-interest that needs to be considered (1150).

If the current other feature-of-interest is the last other feature-of-interest that needs to be considered, then the operation ends. If, however, the current other feature-of-interest is not the last other feature-of-interest that needs to be considered, then the operation advances to the next other feature-of-interest (1160) and returns to the operation of determining whether the location of the current feature-of-interest matches the location of the current other feature-of-interest in both time and space (1120) and continues processing from there.

In this way, it is possible to identify which features-of-interest are the same and which are unique for features-of-interest identified by the same vehicle.

Although not explicitly shown in FIG. 11, this operation will separate the features-of-interest by class and perform this analysis by class such that only features-of-interest of a particular class or compared with each other. In addition, the system can also compare the dimensions of both the current feature-of-interest and another feature-of-interest to determine whether they are a match in dimensions as well as time and location. This can be done either before or after comparing time and location. If the dimensions of the current feature-of-interest and another feature-of-interest are different enough by one or more thresholds, they may be considered different features-of-interest.

FIG. 12 is a flowchart showing an operation (1050) of determining if features detected by different vehicles are the same or unique according to disclosed embodiments.

As shown in FIG. 12, operation begins by setting a first other feature-of-interest as a current other feature-of-interest (1210). The system will have available all of the class, space, and dimension information about both the current feature-of-interest and the current other feature-of-interest.

The system will then determine whether the locations of the current feature-of-interest and the current other feature-of-interest matches within a space tolerance (1220). The space tolerance can be determined by a trial-and-error or assigned based on expert knowledge. In one embodiment the distance tolerance can be between 1-4 meters, more preferably 2-3 meters. This value may change based on the accuracy of the GPS locations used. The two features-of-interest will be determined to not be in the same location if the difference in location does not fall within the space tolerance.

If the system determines that the locations of the current feature-of-interest in the current other feature-of-interest do not match in space, then the system identifies the current feature-of-interest as a unique feature-of-interest (1230).

If, however, the system determines that the locations of the current feature-of-interest in the current other feature-of-interest do match in space, then the system identifies the current feature-of-interest as the same feature-of-interest (1240).

After determining whether the current feature-of-interest is the same as the current other feature-of-interest, the system then determines whether the current other feature-of-interest is the last other feature-of-interest that needs to be considered (1250).

If the current other feature-of-interest is the last other feature-of-interest that needs to be considered, then the operation ends. If, however, the current other feature-of-interest is not the last other feature-of-interest that needs to be considered, then the operation advances to the next other feature-of-interest (1260) and returns to the operation of determining whether the location of the current feature-of-interest matches the location of the current other feature-of-interest in space (1220) and continues processing from there.

In this way, it is possible to identify which features-of-interest are the same and which are unique for features-of-interest identified by different vehicles.

Although not explicitly shown in FIG. 12, this operation will separate the features-of-interest by class and perform this analysis by class such that only features-of-interest of a particular class or compared with each other. In addition, the system can also compare the dimensions of both the current feature-of-interest and another feature-of-interest to determine whether they are a match in dimensions as well as time and location. This can be done either before or after comparing location. If the dimensions of the current feature-of-interest and another feature-of-interest are different enough by one or more thresholds, they may be considered different features-of-interest.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

The invention claimed is:

1. A computer-implemented method for processing image data to generate a Pavement Surface Evaluation and Rating (PASER) report for a road system, comprising:

collecting road data including a plurality of road images;

identifying a plurality of features-of-interest based on the plurality of road images, each of the plurality of features-of-interest being a road irregularity in the road system;

estimating one or more physical parameters of the plurality of features-of-interest based on the plurality of road images;

calculating an actual location for each of the plurality of features-of-interest based on the road data;

uniquely identifying all of the plurality of features-of-interest and eliminating duplicate occurrences of a same feature-of-interest in the plurality of features-of-interest based on the road data and the actual locations of the plurality of features-of-interest;

identifying a corresponding road position for each of the plurality of features-of-interest based on the road data and the actual locations of the plurality of features-of-interest;

associating each of the plurality of features-of-interest with one of a plurality of road segments located within the road system based on the road data and the actual locations of the plurality of features-of-interest;

selecting a first road segment from the plurality of road segments as a selected road segment;

selecting a subset of the plurality of features-of-interest that are located within a selected road segment as a selected subset;

calculating a distance between each unique feature-of-interest in the selected subset and a nearest feature-of-interest in the first subset based on the road data and the actual locations of the plurality of features-of-interest; and generating a PASER estimation value for the selected road segment based on derived data for the selected road segment and stored baseline PASER data, wherein the road images are each associated with a corresponding road segment chosen from the plurality of road segments, and the derived data for the selected road segment includes the one or more physical parameters of the plurality of features-of-interest associated with the selected road segment, the actual location of each of the plurality of features-of-interest associated with the selected road segment, and the distances between the selected features-of-interest and the nearest features-of-interest associated with the selected road segment.

2. The method, as recited in claim 1, further comprising:

repeating the operations of selecting a subset of the plurality of features-of-interest, calculating a distance between the unique feature-of-interest and a nearest feature-of-interest, and generating a PASER estimation value for each remaining road segment in the plurality of road segments; and generating a PASER report based on the PASER estimation values for each of the plurality of road segments associated with the road system.

3. The method, as recited in claim 1, wherein the road data further includes:

a global positioning system location of a vehicle that captured each of the plurality of road images at the moment when the vehicle captured a corresponding road image, and a date and time when the vehicle captured the corresponding road image.

4. The method, as recited in claim 1, wherein the operation of calculating an actual location for each of the plurality of features-of-interest further includes:

identifying a current location of a vehicle on the road;

identifying a selected feature-of-interest from the plurality of features-of-interest based on a corresponding road image selected from the plurality of road images and captured by a camera associated with the vehicle;

identifying a shortest distance from the vehicle to the selected feature-of-interest based on the corresponding road image;

identifying a deflection angle of the shortest distance from the vehicle to the selected feature-of-interest with respect to a reference direction;

modifying the current location of the vehicle based on the shortest distance and the deflection angle to generate the actual location of the selected feature-of-interest; and repeating the operations of identifying a current location of a vehicle, identifying a selected feature-of-interest, identifying a shortest distance, identifying a deflection angle, and modifying the current location of the vehicle based for each remaining feature-of-interest in the plurality of features-of-interest.

5. The method, as recited in claim 1, wherein the operation of uniquely identifying all of the plurality of features-of-interest and eliminating duplicate occurrences of a same feature-of-interest in the plurality of features-of-interest further includes:

selecting a first feature-of-interest from the plurality of features-of-interest, the first feature-of-interest being associated with a first road image selected from the plurality of road images;

identifying a first actual location of the first feature-of-interest;

identifying a vehicle associated with a camera that captured the first road image;

identifying a first date and time at which the camera captured the first road image;

selecting a second feature-of-interest from the plurality of features-of-interest, the second feature-of-interest being associated with a second road image selected from the plurality of road images, the second road image having been captured by the camera;

identifying a second actual location of the second feature-of-interest;

identifying a second date and time at which the camera captured the second road image;

comparing the first date and time with the second date and time to determine if the first date and time is within a set time threshold of the second date and time; and comparing the first actual location with the second actual location to determine if the first actual location is within a set distance threshold of the second actual location.

6. The method, as recited in claim 1, wherein the operation of uniquely identifying all of the plurality of features-of-interest and eliminating duplicate occurrences of a same feature-of-interest in the plurality of features-of-interest further includes:

selecting a first feature-of-interest from the plurality of features-of-interest, the first feature-of-interest being associated with a first road image selected from the plurality of road images;

identifying a first actual location of the first feature-of-interest;

identifying a first vehicle associated with a first camera that captured the first road image;

selecting a second feature-of-interest from the plurality of features-of-interest, the second feature-of-interest being associated with a second road image selected from the plurality of road images, the second road image having been captured by a second camera associated with a second vehicle different than the first vehicle;

identifying a second actual location of the second feature-of-interest; and comparing the first actual location with the second actual location to determine if the first actual location is within a set distance threshold of the second actual location.

7. A non-transitory computer-readable medium comprising instructions for execution by a computer, the instructions including a computer-implemented method for processing image data to generate a Pavement Surface Evaluation and Rating (PASER) report for a road system, the instructions for implementing:

collecting road data including a plurality of road images;

identifying a plurality of features-of-interest based on the plurality of road images, each of the plurality of features-of-interest being a road irregularity in the road system;

estimating one or more physical parameters of the plurality of features-of-interest based on the plurality of road images;

calculating an actual location for each of the plurality of features-of-interest based on the road data;

uniquely identifying all of the plurality of features-of-interest and eliminating duplicate occurrences of a same feature-of-interest in the plurality of features-of-interest based on the road data and the actual locations of the plurality of features-of-interest;

identifying a corresponding road position for each of the plurality of features-of-interest based on the road data and the actual locations of the plurality of features-of-interest, associating each of the plurality of features-of-interest with one of a plurality of road segments located within the road system based on the road data and the actual locations of the plurality of features-of-interest;

selecting a first road segment from the plurality of road segments as a selected road segment;

selecting a subset of the plurality of features-of-interest that are located within a selected road segment as a selected subset;

calculating a distance between each unique feature-of-interest in the selected subset and a nearest feature-of-interest in the first subset based on the road data and the actual locations of the plurality of features-of-interest; and generating a PASER estimation value for the selected road segment based on derived data for the selected road segment and stored baseline PASER data, wherein the road images are each associated with a corresponding road segment chosen from the plurality of road segments, and the derived data for the selected road segment includes the one or more physical parameters of the plurality of features-of-interest associated with the selected road segment, the actual location of each of the plurality of features-of-interest associated with the selected road segment, and the distances between the selected features-of-interest and the nearest features-of-interest associated with the selected road segment.

8. The non-transitory computer-readable medium, as recited in claim 7, wherein the instructions are further for implementing:

repeating the operations of selecting a subset of the plurality of features-of-interest, calculating a distance between the unique feature-of-interest and a nearest feature-of-interest, and generating a PASER estimation value for each remaining road segment in the plurality of road segments; and generating a PASER report based on the PASER estimation values for each of the plurality of road segments associated with the road system.

9. The non-transitory computer-readable medium, as recited in claim 7, wherein the road data further includes:

a global positioning system location of a vehicle that captured each of the plurality of road images at the moment when the vehicle captured a corresponding road image, and a date and time when the vehicle captured the corresponding road image.

10. The non-transitory computer-readable medium, as recited in claim 7, wherein the operation of calculating an actual location for each of the plurality of features-of-interest further includes:

identifying a current location of a vehicle on the road;

identifying a selected feature-of-interest from the plurality of features-of-interest based on a corresponding road image selected from the plurality of road images and captured by a camera associated with the vehicle;

identifying a shortest distance from the vehicle to the selected feature-of-interest based on the corresponding road image;

identifying a deflection angle of the shortest distance from the vehicle to the selected feature-of-interest with respect to a reference direction;

modifying the current location of the vehicle based on the shortest distance and the deflection angle to generate the actual location of the selected feature-of-interest; and repeating the operations of identifying a current location of a vehicle, identifying a selected feature-of-interest, identifying a shortest distance, identifying a deflection angle, and modifying the current location of the vehicle based for each remaining feature-of-interest in the plurality of features-of-interest.

11. The non-transitory computer-readable medium, as recited in claim 7, wherein the operation of uniquely identifying all of the plurality of features-of-interest and eliminating duplicate occurrences of a same feature-of-interest in the plurality of features-of-interest further includes:

selecting a first feature-of-interest from the plurality of features-of-interest, the first feature-of-interest being associated with a first road image selected from the plurality of road images;

identifying a first actual location of the first feature-of-interest;

identifying a vehicle associated with a camera that captured the first road image;

identifying a first date and time at which the camera captured the first road image;

selecting a second feature-of-interest from the plurality of features-of-interest, the second feature-of-interest being associated with a second road image selected from the plurality of road images, the second road image having been captured by the camera;

identifying a second actual location of the second feature-of-interest;

identifying a second date and time at which the camera captured the second road image;

comparing the first date and time with the second date and time to determine if the first date and time is within a set time threshold of the second date and time; and comparing the first actual location with the second actual location to determine if the first actual location is within a set distance threshold of the second actual location.

12. The non-transitory computer-readable medium, as recited in claim 7, wherein the operation of uniquely identifying all of the plurality of features-of-interest and eliminating duplicate occurrences of a same feature-of-interest in the plurality of features-of-interest further includes:

selecting a first feature-of-interest from the plurality of features-of-interest, the first feature-of-interest being associated with a first road image selected from the plurality of road images;

identifying a first actual location of the first feature-of-interest;

identifying a first vehicle associated with a first camera that captured the first road image;

selecting a second feature-of-interest from the plurality of features-of-interest, the second feature-of-interest being associated with a second road image selected from the plurality of road images, the second road image having been captured by a second camera associated with a second vehicle different than the first vehicle;

identifying a second actual location of the second feature-of-interest; and comparing the first actual location with the second actual location to determine if the first actual location is within a set distance threshold of the second actual location.

13. A computer system configured for processing image data to generate a Pavement Surface Evaluation and Rating (PASER) report for a road system, the system comprising:

a memory configured to store data and instructions; and a processor cooperatively operable with the memory, and configured to facilitate:

collecting road data including a plurality of road images;

identifying a plurality of features-of-interest based on the plurality of road images, each of the plurality of features-of-interest being a road irregularity in the road system;

estimating one or more physical parameters of the plurality of features-of-interest based on the plurality of road images;

calculating an actual location for each of the plurality of features-of-interest based on the road data;

uniquely identifying all of the plurality of features-of-interest and eliminating duplicate occurrences of a same feature-of-interest in the plurality of features-of-interest based on the road data and the actual locations of the plurality of features-of-interest;

identifying a corresponding road position for each of the plurality of features-of-interest based on the road data and the actual locations of the plurality of features-of-interest;

associating each of the plurality of features-of-interest with one of a plurality of road segments located within the road system based on the road data and the actual locations of the plurality of features-of-interest;

selecting a first road segment from the plurality of road segments as a selected road segment;

selecting a subset of the plurality of features-of-interest that are located within a selected road segment as a selected subset;

calculating a distance between each unique feature-of-interest in the selected subset and a nearest feature-of-interest in the first subset based on the road data and the actual locations of the plurality of features-of-interest; and generating a PASER estimation value for the selected road segment based on derived data for the selected road segment and stored baseline PASER data, wherein the road images are each associated with a corresponding road segment chosen from the plurality of road segments, and the derived data for the selected road segment includes the one or more physical parameters of the plurality of features-of-interest associated with the selected road segment, the actual location of each of the plurality of features-of-interest associated with the selected road segment, and the distances between the selected features-of-interest and the nearest features-of-interest associated with the selected road segment.

14. The computer system, as recited in claim 13, the processor is further configured to facilitate:

repeating the operations of selecting a subset of the plurality of features-of-interest, calculating a distance between the unique feature-of-interest and a nearest feature-of-interest, and generating a PASER estimation value for each remaining road segment in the plurality of road segments; and generating a PASER report based on the PASER estimation values for each of the plurality of road segments associated with the road system.

15. The computer system, as recited in claim 13, wherein the road data further includes:

a global positioning system location of a vehicle that captured each of the plurality of road images at the moment when the vehicle captured a corresponding road image, and a date and time when the vehicle captured the corresponding road image.

16. The computer system, as recited in claim 13, wherein the operation of calculating an actual location for each of the plurality of features-of-interest further includes:

identifying a current location of a vehicle on the road;

identifying a selected feature-of-interest from the plurality of features-of-interest based on a corresponding road image selected from the plurality of road images and captured by a camera associated with the vehicle;

identifying a shortest distance from the vehicle to the selected feature-of-interest based on the corresponding road image;

identifying a deflection angle of the shortest distance from the vehicle to the selected feature-of-interest with respect to a reference direction;

modifying the current location of the vehicle based on the shortest distance and the deflection angle to generate the actual location of the selected feature-of-interest; and repeating the operations of identifying a current location of a vehicle, identifying a selected feature-of-interest, identifying a shortest distance, identifying a deflection angle, and modifying the current location of the vehicle based for each remaining feature-of-interest in the plurality of features-of-interest.

17. The computer system, as recited in claim 13, wherein the operation of uniquely identifying all of the plurality of features-of-interest and eliminating duplicate occurrences of a same feature-of-interest in the plurality of features-of-interest further includes:

selecting a first feature-of-interest from the plurality of features-of-interest, the first feature-of-interest being associated with a first road image selected from the plurality of road images;

identifying a first actual location of the first feature-of-interest;

identifying a vehicle associated with a camera that captured the first road image;

identifying a first date and time at which the camera captured the first road image;

selecting a second feature-of-interest from the plurality of features-of-interest, the second feature-of-interest being associated with a second road image selected from the plurality of road images, the second road image having been captured by the camera;

identifying a second actual location of the second feature-of-interest;

identifying a second date and time at which the camera captured the second road image;

comparing the first date and time with the second date and time to determine if the first date and time is within a set time threshold of the second date and time; and comparing the first actual location with the second actual location to determine if the first actual location is within a set distance threshold of the second actual location.

* * * * *